(12) United States Patent
Kadowaki

(10) Patent No.: US 8,159,686 B2
(45) Date of Patent: *Apr. 17, 2012

(54) IMAGE PROCESSING JOB SCHEDULER

(75) Inventor: Toshihiro Kadowaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,396

(22) Filed: Apr. 29, 2011

(65) Prior Publication Data

US 2011/0222090 A1 Sep. 15, 2011

Related U.S. Application Data

(63) Continuation of application No. 11/180,523, filed on Jul. 14, 2005, now Pat. No. 7,944,570.

(30) Foreign Application Priority Data

Jul. 15, 2004 (JP) ................................ 2004-208632
May 18, 2005 (JP) ................................ 2005-145530

(51) Int. Cl.
*G06K 15/00* (2006.01)
*G06F 3/12* (2006.01)
*G06F 3/00* (2006.01)
*G03G 15/00* (2006.01)

(52) U.S. Cl. .................... 358/1.12; 358/1.14; 358/1.15; 358/1.16; 358/488; 399/81; 715/700

(58) Field of Classification Search ................ 358/1.12, 358/1.14, 1.15, 1.16, 488; 399/81; 715/700
See application file for complete search history.

(56) References Cited

U.S. PATENT DOCUMENTS

| 6,216,187 | B1 | 4/2001 | Truong ............... 710/103 |
| 6,753,867 | B2 | 6/2004 | Mullin |
| 2001/0053301 | A1 | 12/2001 | Nishii |
| 2002/0027673 | A1 | 3/2002 | Roosen et al. |
| 2002/0105674 | A1 | 8/2002 | Nomura et al. |
| 2002/0171868 | A1 | 11/2002 | Yoshimura et al. |
| 2003/0093670 | A1 | 5/2003 | Matsubayashi et al. |

(Continued)

FOREIGN PATENT DOCUMENTS

JP 63-275374 11/1988

(Continued)

OTHER PUBLICATIONS

Japanese Office Action dated Jun. 2, 2009 in Counterpart Application No. 002087701.

*Primary Examiner* — Twyler Haskins
*Assistant Examiner* — Fred Guillermety
(74) *Attorney, Agent, or Firm* — Fitzpatrick, Cella, Harper & Scinto

(57) ABSTRACT

To keep track of which process each process job currently exits and when it comes in own charge or which job must be processed, it is necessary to use a workflow system on a PC, and this necessitates to move back and force between the PC and the apparatus, thereby leading to the deterioration of the operational efficiency. An object of the invention is to provide a system in which the apparatus and the workflow server are connected, and by moving forward the processing by using the operation unit of the apparatus, the workflow of the operator in the centralized copy room and the print center of the company can be smoothly moved forward.

9 Claims, 27 Drawing Sheets

U.S. PATENT DOCUMENTS

2004/0220847 A1    11/2004    Ogushi

FOREIGN PATENT DOCUMENTS

| JP | 3-154089 | 7/1991 |
| JP | 08-036538 | 2/1996 |
| JP | 9-051397 | 2/1997 |
| JP | 63-264093 | 10/1998 |
| JP | 11-134125 | 5/1999 |
| JP | 11-187163 | 7/1999 |
| JP | 11-288334 | 10/1999 |
| JP | 2002281200 A * | 9/2002 |
| JP | 2002-288580 | 10/2002 |
| JP | 2003-189036 | 7/2003 |
| JP | 2004-164614 A | 6/2004 |

* cited by examiner

FIG. 3A

OUTPUT/BOOKBINDING SERVICE: PLEASE DESIGNATE ELECTRONIC DATA TO BE INPUTTED AND INPUT IT

● ELECTRONICALLY  ○ INPUT VIA MEDIA
   TO BE INPUTTED — L101

FILE NAME: TEST.DOC — L102

[REFERENCE] — 22

NUMBER OF PAGES: 60 — L103

OS AT PREPARATION TIME: XXX — L104

PREPARATION AP: YYY — L105

COPY/SCAN SERVICE: PLEASE DESIGNATE TYPE AND PROCESSING OF PAPER ORIGINAL TO BE INPUTTED

- ● BOOK ORIGINAL  ○ PAPER ORIGINAL  ● A4 ORIGINAL  ○ OTHER ORIGINAL —L201
- ● COLOR  ○ MONOCHROME  ○ COLOR/MONOCHROME MIXED —L202
- ○ ONE SIDE  ● BOTH-SIDES —L203
- ○ NO PROCESSING  ● TILT CORRECTION  ○ DUST REMOVING  ○ PUNCH TRACE REMOVAL —L204
- ○ JPEG  ○ PDF  ○ HIGH-PRESSURE PDF  ● PDF+OCR —L205
- ● 200DPI  ○ 400DPI  ○ 600DPI —L206
- NUMBER OF PAGES: 40 —L207
- ● E-MAIL TRANSMISSION  ○ SHARED FOLDER TRANSMISSION  ○ TRANSMISSION BY MEDIA —L208
- TRANSMIT DESTINATION OF SCAN DATA: xxx.xxxxx.co.jp —L209
- ● ORIGINAL NAME: INSTRUCTION MANUAL OF PRODUCT B —L210

COPY/OUTPUT/BOOKBINDING SERVICE: PLEASE DESIGNATE BOOKBINDING FORMAT

- ● A4 ○ A3 ○ B4 ○ B5 — L301
- ● COLOR ○ MONOCHROME ○ COLOR/MONOCHROME AUTOMATIC — L302
- ○ ONE SIDE ● BOTH-SIDES — L303
- ● COLOR PLAIN PAPER ○ MONOCHROME PLAIN PAPER ○ CARDBOARD ○ COATED PAPER — L304
- ○ NO COVER SHEET ● WITH COVER SHEET (PRINT AVAILABLE) ● WITH COVER SHEET (NO PRINT AVAILABLE) — L305
- ○ NO BOOKBINDING ● BOOKBINDING WITH CLOTH COVER ○ BOOKBINDING WITH SADDLE STITCHING ○ BOOKBINDING WITH STAPLE — L306
- ● NO PUNCH ○ THREE HOLE PUNCH ○ 26 HOLE PUNCH — L307
- ○ NO CUTTING ● ONE-WAY CUTTING ○ THREE-WAY CUTTING — L308
- NUMBER OF COPIES: 20 — L309

45 ORDER MANAGEMENT INFORMATION STORAGE UNIT

42

| | | | |
|---|---|---|---|
| ID | 0024 | −L701 | ORDER PROGRESS MANAGEMENT INFORMATION |
| DATE OF ORDER PLACED | 12/6 | −L702 | |
| DELIVERY DATE | 12/9 | −L703 | |
| TYPE OF ORDER | SCAN | −L704 | |
| PERSON IN CHARGE | OPERATOR B | −L705 | |
| PROCESS/JOB | EDITING | −L706 | |
| ORIGINAL TYPE | MONOCHROME ORIGINAL | −L707 | ORIGINAL INFORMATION |
| ORIGINAL SIZE | A4 | −L708 | |
| COLOR/MONOCHROME | COLOR | −L709 | |
| ONE SIDE/BOTH-SIDES | BOTH-SIDES | −L710 | |
| NUMBER OF PAGES | 40 | −L711 | |
| PROCESS | TILT CORRECTION | −L712 | SCAN/PROCESS FORMAT |
| FORMAT | PDF+OCR | −L713 | |
| RESOLUTION | 200DPI | −L714 | |
| SCAN DATA | SCAN IMAGE.PDF | −L715 | SCAN/DATA |
| DESTINATION | E-MAIL, xxxx.xxxxx.co.jp | −L716 | CONTACT ADDRESS INFORMATION |
| ORDERER | XX DEVELOPMENT SECTION KADOWAKI | −L717 | ORDERER INFORMATION |
| ORDERER CONTACT ADDRESS | 999-9999 | −L718 | |

| | | | |
|---|---|---|---|
| ID | 0025 | −L719 | ORDER PROGRESS MANAGEMENT INFORMATION |
| DATE OF ORDER PLACED | 12/6 | −L720 | |
| DELIVERY DATE | 12/8 | −L721 | |
| TYPE OF ORDER | PRINT | −L722 | |
| PERSON IN CHARGE | NOT YET DETERMINED A | −L723 | |
| PROCESS/JOB | ORDER RECEIVED | −L724 | |
| PRINT FILE | PROJECT DOCUMENT.DOC | −L725 | ORIGINAL ELECTRONIC DATA INFORMATION |
| PRINT SIZE | A4 | −L726 | PRINT/BOOKBINDING FORMAT |
| COLOR/MONOCHROME | COLOR | −L727 | |
| (OMITTED: OTHER PRINT PROCESSING FORMAT INFORMATION) | | −L728 | |
| TYPE OF DELIVERY | INTER-OFFICE DELIVERY | −L729 | DELIVERY FORMAT |
| ADDRESS FOR DELIVERY | XX BUSINESS PLACE XX DEVELOPMENT SECTION | −L730 | |
| (OMITTED: OTHER DELIVERY FORMAT INFORMATION) | | −L731 | |
| ORDERER | XX DEVELOPMENT SECTION KADOWAKI | −L732 | ORDERER INFORMATION |
| ORDERER CONTACT ADDRESS | 999-9999 | −L733 | |

59
OPERATOR INFORMATION/ PROCESSING METHOD SETUP INFORMATION

| | |
|---|---|
| OPERATOR ID: 0001 | –L801 |
| OPERATOR NAME: OPERATOR A | –L802 |
| PASSWORD 1: 12345 | –L803 |
| PASSWORD 2: 2348752478624 | –L804 |
| AFFILIATED WITH: XX POD CENTER | –L805 |
| CONTACT ADDRESS: 888-8888 | –L806 |
| PROCESSING METHOD SETUP 1 | –L807 |
|    DEVICE ID = 100 | –L808 |
|    PROCESS/JOB = SCAN, COPY, PRINT | –L809 |
|    TILT CORRECTIOIN PROCESSING AT SCAN TIME = EXECUTION | –L810 |
|    OCR PROCESSING AT SCAN TIME = NON-EXECUTION | –L811 |
|    STAPLE PROCESSING AT PRINT TIME = EXECUTION | –L812 |
|    PUNCH PROCESSING ST PRINT TIME = EXECUTION | –L813 |
|    CUTTING PROCESSING AT PRINT TIME = NON-EXECUTION | –L814 |
| PROCESSING METHOD SETUP 2 | –L815 |
|    DEVICE ID = 101 | –L816 |
|    PROCESS/JOB = SCAN | –L817 |
|    TILT CORRECTION PROCESSING AT PRINT TIME = NON-EXECUTION | –L818 |
|    OCR PROCESSING AT SCAN TIME = NON-EXECUTION | –L819 |
| PROCESSING METHOD SETUP 3 | –L820 |
|    DEVICE ID =102 | –L821 |
|    PROCESS/JOB = PRINT | –L822 |
|    STAPLE PROCESSING AT PRINT TIME = EXECUTION | –L823 |
|    PUNCH PROCESSING AT PRINT TIME = NON-EXECUTION | –L824 |
|    CUTTING PROCESSING AT PRINT TIME = NON-EXECUTION | –L825 |

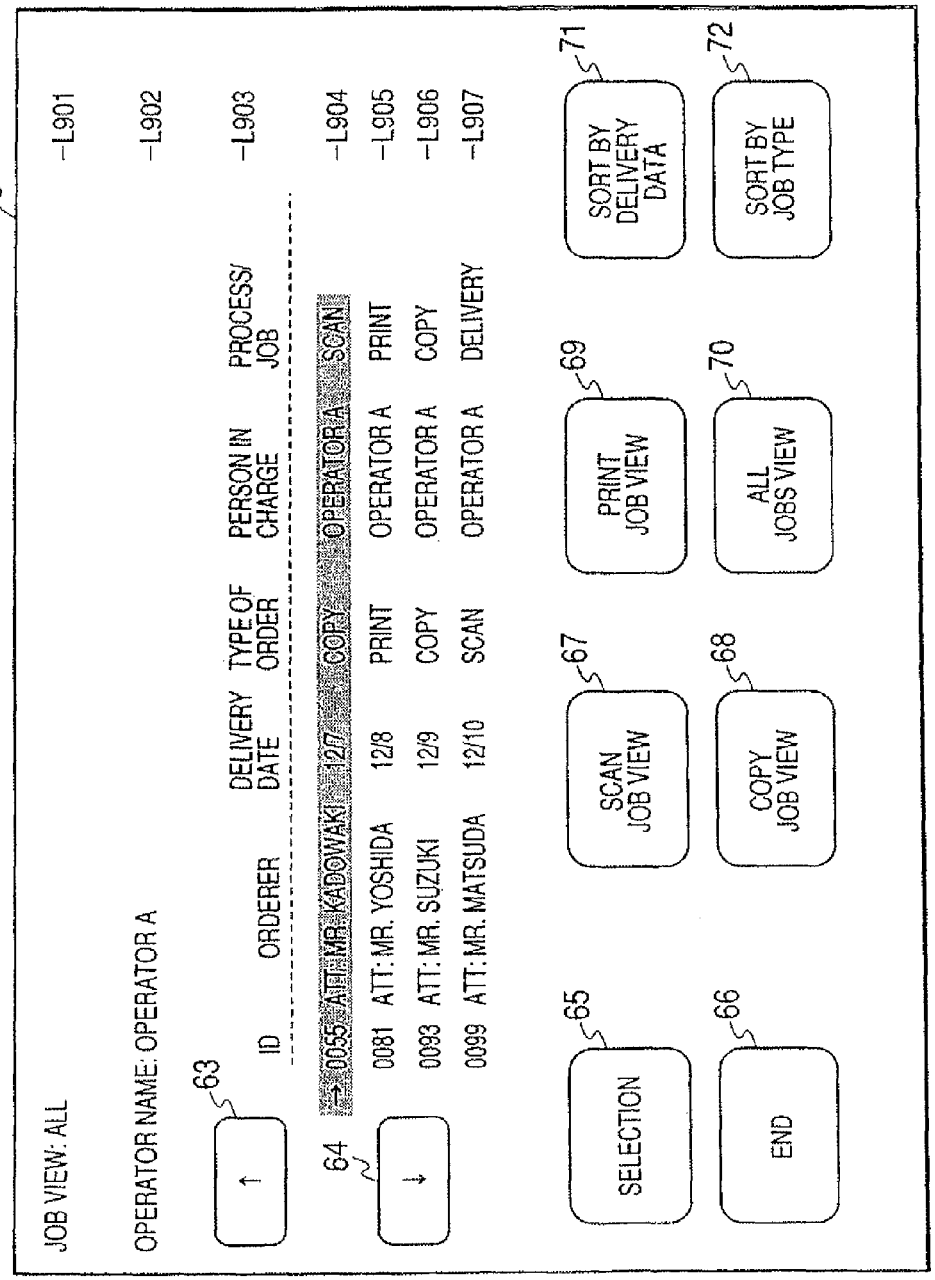

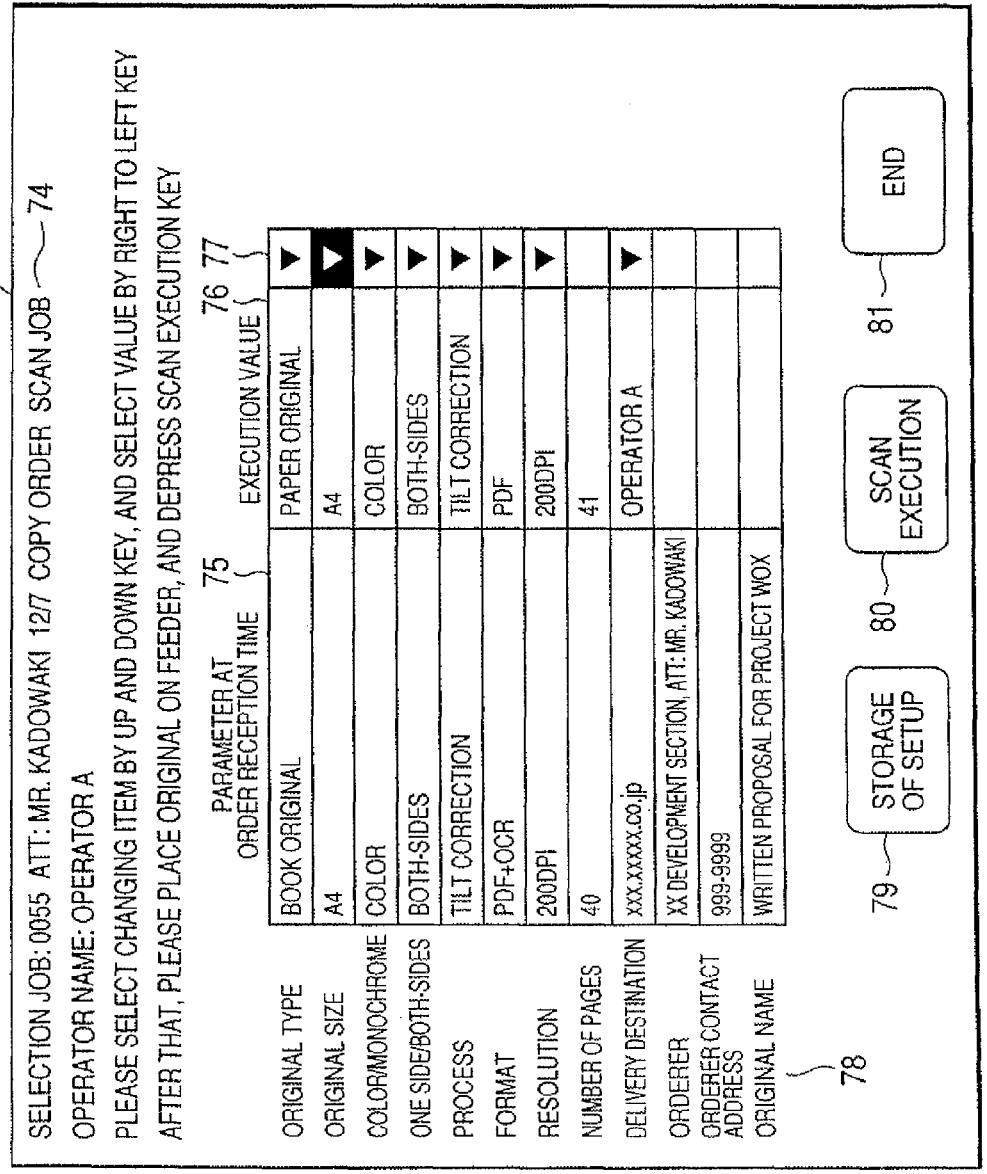

FIG. 22

```
                                                                       ~142
                                                                 ~142
SELECTION JOB: 0055  ATT: MR. KADOWAKI  12/7  COPY ORDER  SCAN JOB    —L1201
OPERATOR NAME: OPERATOR A
  PLEASE SPEED UP PROCESS
PROCESS CHART:
        PROCESS/        PERSON IN        (SCHEDULE)      (SCHEDULE)    —L1202
        JOB             CHARGE           DAY & HOUR      DEVICE

ORDER RECEIVED  MANAGER A        12/7 15-15:30   PC-G          —L1203
   →    SCAN            OPERATOR A       12/7 15-15:30   MFP-A         —L1204
        EDITING/PROCESS OPERATOR B       12/7 15-15:30   PC-F          —L1205
        PRINT           OPERATOR C       12/7 15-15:30   PRINTER C     —L1206
        DELIVERY        NOT YET DETERMINED  NOT YET DETERMINED  NOT YET DETERMINED  —L1207

○ NEXT OPERATOR  —L1208       ○ NEXT PROCESS/JOB  —L1209
                    ⌐143                             ⌐144
   | OPERATOR B  △ |              | EDITING/PROCESS  △ |

○ NEXT OPERATOR/COMMENT UNIT TOWARD PROCESS                          ⌐146
    PLEASE BE CAREFUL AS NUMBER OF PAGES IS 41  ⌐145    |   OK   |
    INSTEAD OF 40
```

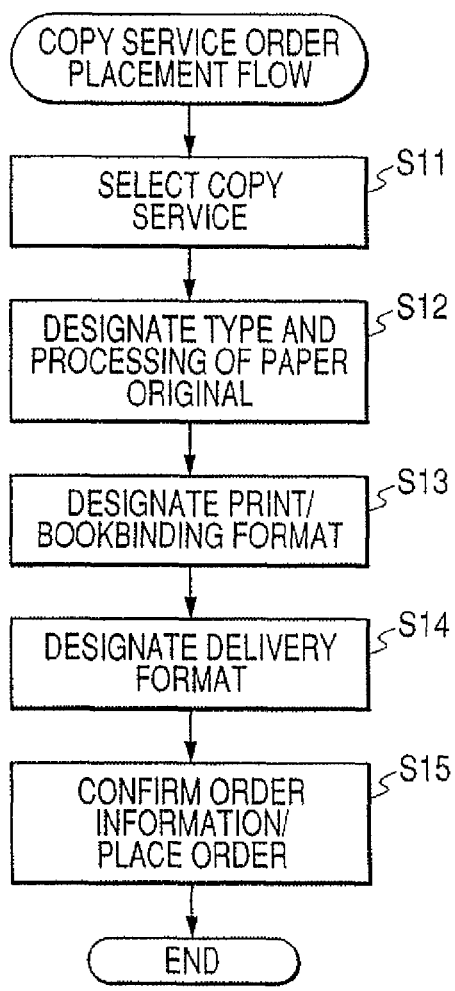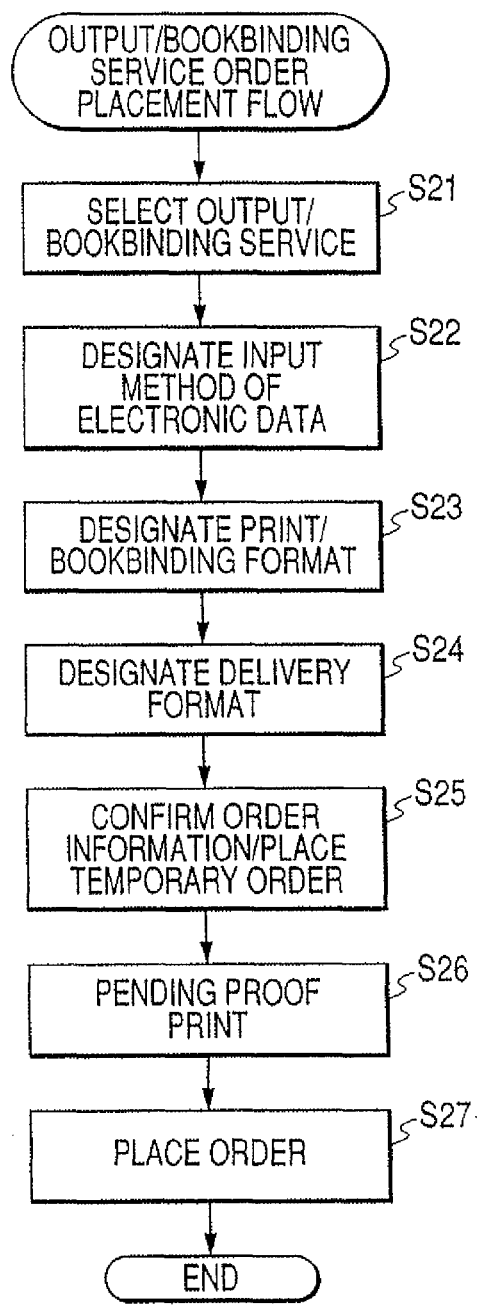

FIG. 25A

COPY/OUTPUT/BOOKBINDING SERVICE: PLEASE DESIGNATE ADDRESS FOR DELIVERY — 28
● INTER-OFFICE DELIVERY — L401
   ADDRESS FOR DELIVERY: KOSUGI OFFICE 22 DEVELOPMENT SECTION — L402
   FULL NAME: KADOWAKI — L403
   TELEPHONE: 999-9999 — L404

○ HOME DELIVERY — L405
   POSTAL CODE NUMBER: 211-8501 — L406
   ADDRESS: XX CITY, XX WARD, XX TOWN, XX DEVELOPMENT SECTION — L407
   FULL NAME: KADOWAKI — L408

○ PICK UP — L409
   PICK UP SCHEDULED DATE: JANUARY, 15 — L410

DO YOU PLACE ORDER? — 30
● COPY SERVICE — L501
● ROUGH ESTIMATE OF CHARGE: ￥2,000 — L502
● DESIRED DELIVERY DATE: 12/7 — L503
● ORDERER INFORMATION — L504
   BUSINESS PLACE: KOSUGI — L505
   AFFILIATION: 22 DEVELOPMENT SECTION — L506
   FULL NAME: KADOWAKI — L507
   E-MAIL: kadowaki.xxx.co.jp — L508
   TELEPHONE NUMBER: 999-9999 — L509

[OK] — 31    [CANCELLED] — 32

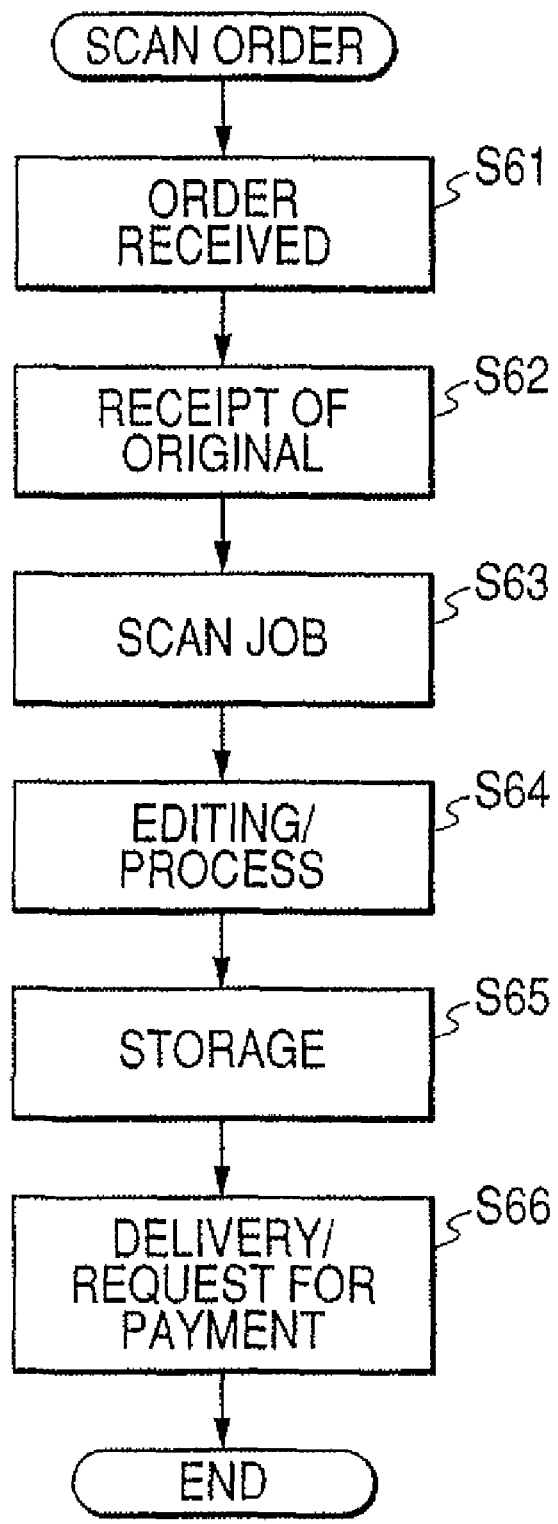

ized copy or print center of the company and the like by an operator of the centralized copy or print center, and the like, and an image processing apparatus, and an order management apparatus.

IMAGE PROCESSING JOB SCHEDULER

This application is a continuation application of application Ser. No. 11/180,523, filed Jul. 14, 2005 (now allowed), the contents of which are incorporated by reference herein.

BACKGROUND OF THE INVENTION

1. Field of the Invention

The present invention relates to a system for smoothly executing a scan job and a copy bookbinding job electronically received from an in-company orderer at the centralized copy or print center of the company and the like by an operator of the centralized copy or print center, and the like, and an image processing apparatus, and an order management apparatus.

2. Related Background Art

In general, as an operation by using an operation unit of the apparatus, heretofore, there has been proposed a push scan or a pull print. For example, in the case of the push scan, an original is loaded on a copy board of an image reading apparatus, and by using the operation unit, the destination of a folder and the like within one's own PC is specified, and after that, activation of a scan operation is performed. At this time, the setups of a reading mode of an image and a destination and the like have been specified by using the operation unit of the apparatus.

In the meantime, in the case of the pull print, the URL of an external apparatus is specified by using the operation unit of a printer apparatus, and the pages of the specified URL have been printed. At this time, a print mode such as a type of the sheet, a both-side mode, a sort mode and the like has been specified by using the operation unit of the apparatus (see Japanese Patent Application Laid-Open Nos. H09-051397 and H11-134125).

In the centralized copy room and the pint center of the company, a plurality of operators execute in order high value-added editing operations not creatable in an ordinary office by a plurality of processes. To control each of these processes, there exists a workflow system on a PC. Heretofore, it has been necessary for the operator to use the workflow system on the PC to see at which process each process job is currently located, and how soon it comes to his own charge or which job he has to process, and this has necessitated him to move back and forth between the PC and the apparatus, thereby leading to deterioration of operational efficiency. Further, to prevent deterioration of operational efficiency, there has been disclosed an invention of a push scan or a pull print as a system which performs the processing by the operation unit only of the apparatus.

However, the push scan has been a job which is completed by a simple process to scan an original and transmits it only to a predetermined place, and has not been associated with the workflow system on the PC that performs the process management of the job requiring a plurality of processes.

Further, a pull print is also a job which is completed by a simple process for acquiring a document specified by an URL on the external apparatus and printing it, and has not been associated with the workflow system on the PC which performs a process control of the job requiring a plurality of processes.

The present invention has been made in view of the above described situation, and an object of the invention is to provide a system where, through the association of the apparatus with the workflow server and through moving forward the processing by using the operation unit of the apparatus, the workflow of the operator in the centralized copy room and the print center can be smoothly carried out.

SUMMARY OF THE INVENTION

To solve the above described problems, the present invention consists of the following configuration.

A work processing apparatus for receiving a process job from an order management apparatus controlling an order from an orderer, comprising:

a transmitting means for transmitting identification information of an operator and identification information of the work processing apparatus to the order management apparatus;

an acquiring means for acquiring information of the process job extracted by the order management apparatus in response to the identification information of the operator and the identification information of the work processing apparatus transmitted by the transmitting means; and a display control means for displaying the information of a plurality of process jobs acquired by the acquiring means in a display unit.

Alternatively, to solve the above described problems, the present invention consists of the following configuration. An order management apparatus, comprising; storing means for storing the process job based on an order from the orderer; identification information receiving means for receiving identification information on an operator and identification information on an image processing apparatus from the image processing apparatus connected to the order management apparatus by a network; extracting means for extracting information on a corresponding process job according to the identification information on the operator and the identification information on the image processing apparatus received by the identification information receiving means from the process job stored by the storing means; and process job transmitting means for transmitting the information on the process job extracted by the extracting means to the image processing apparatus.

BRIEF DESCRIPTION OF THE DRAWINGS

FIGS. 3A and 3B are views explaining an order entry flow on the orderer PC;

FIG. 4 is a screen designating a print/bookbinding format in the order entry flow;

FIG. 7 is a view explaining an order management information storage unit 45;

FIG. 9 is a view explaining operator information/processing method setup information;

FIG. 10 is a display screen of the list of information on a process job in the operation unit of the image processing apparatus in the first embodiment;

FIG. 11 is a detail display screen of information on a scan process job in the operation unit of the image processing apparatus;

FIG. 22 is a renewed screen of a workflow in the operation unit of the image processing apparatus;

FIGS. 24A and 24B are views explaining the order entry flow of a copy service and an output/bookbinding service;

FIGS. 25A and 25B are views showing a screen performing a delivery format designation; and FIG. 26 is a view explaining a processing flow of a scan order received.

DETAILED DESCRIPTION OF THE PREFERRED EMBODIMENTS

First Embodiment

<Workflow System Configuration>

An image processing apparatus will be described as an example of the work processing apparatus of the present invention.

Figure 1:
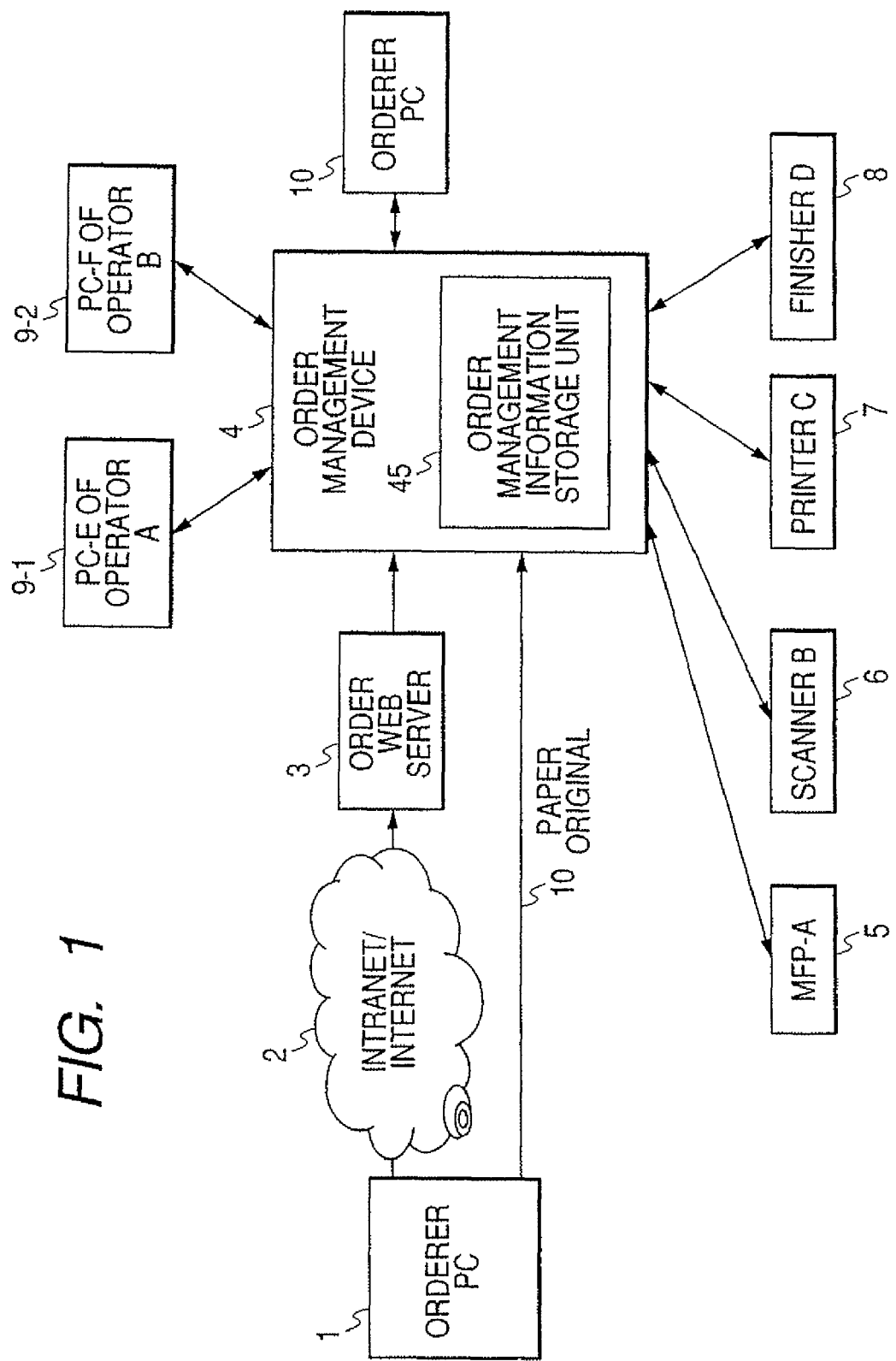
FIG. 1 is a whole block diagram of an image processing system.

FIG. 1 is a whole block diagram of an image processing system. An orderer performs order entry of various services to be described later for an order entry Web server 3 from a PC-1 through an Intranet or an Internet 2. At this time, together with orderer information, the designation of a scan format, a print format, a bookbinding process format, and a delivery format as well as an electronic data for use of the print and the like are transmitted to the order entry Web server 3 through the Intranet or the Internet 2. In the meantime, a media such as CD-ROM and the like inputted with a paper original and an electronic data for use of a print service, which becomes original data in the case of using a scan service and a copy service is sent to an output foothold by physical conveying means such as an inter-office mail.

Various orders received by the order entry Web server 3 are transmitted to an output foothold server 4, and a manager PC 10 prepares process jobs which are individual works processed by each operator from the orders stored in the output foothold server 4. A CPU of the order management apparatus transmits the process jobs prepared by the manager PC to various apparatuses such as a PC9-1 and a PC9-2 of each operator requesting for the transmission, a MFP-A5, a scanner B6, a printer C7, a finisher 8, and the like. Then, a scan processing, a copy processing, an editing/process processing, a print processing, a finishing processing and the like are performed, and a printed matter and a bookbinding matter and the like, which are the output of the processing result, are delivered to the orderer by an inter-office delivery and the like. In the following description, the present embodiment handles the output foothold server 4 for controlling orders as the order management apparatus 4.

<Order Processing of Orderer>

Figure 2:
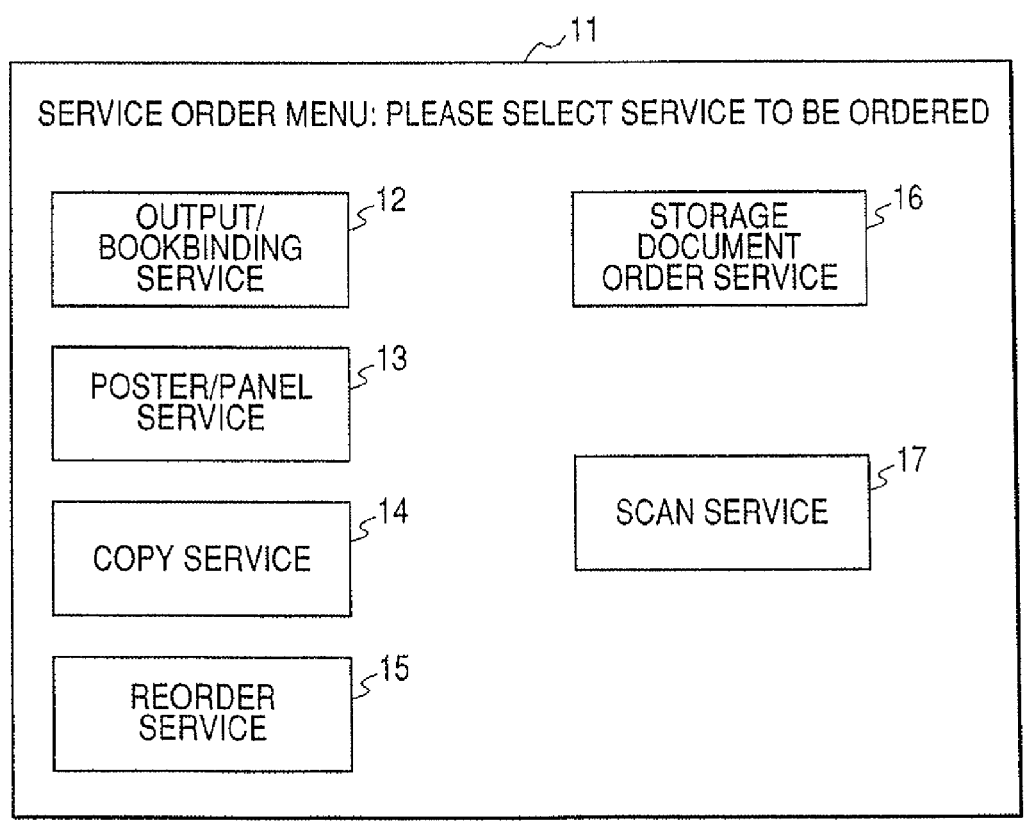
FIG. 2 is a service order entry screen for an order entry Web server on an orderer PC.

FIG. 2 is a service order entry screen for the order entry Web Server 3 on the orderer PC 1. In this screen, six service order buttons 12 to 17 are displayed. A "Output/Bookbinding Service" 12 is an entry button for ordering an output/bookbinding, in which an electronic data is inputted and printed in a specified format. This is a service for performing a specified bookbinding (with staple or with cloth cover) for the printed result matter and delivering it to a specified destination. Next, a "Poster/Panel Service" 13 is an entry button for ordering a poster panel service, in which an electronic data is inputted and printed in a large-sized paper in a specified format. Further, this is a service which performs a specified panel process for the printed result matter and delivers it to a specified destination. A "Copy Service" 14 is an entry button for ordering the copy service, in which a paper original is inputted, and is scanned in a specified format, and is printed in a specified format. Further, this is a service in which a specified bookbinding process is performed for the printed matter, which is delivered to the specified destination.

A "Reorder Service" 15 is an entry button for ordering a reorder service, which is a service performing the same order again as the service ordered before, and does not require various types of setting up labor and time since the same content as ordered before is ordered as it is. A "Storage Document Order Service" 16 is an entry button for ordering a storage document order service, and this is a service which specifies a storage document stored in the output foothold, and prints it, and delivers it to a specified delivery destination. In this case, regarding each storage document, a print format is fixed. A "Scan Service" 17 is an entry button for ordering a scan service, which inputs a paper original, and scans it in a specified format. This is a service, which performs a specified process regarding the scanned image data, and transmits it to a specified destination.

FIG. 3A is a view of an orderer PC 1 when the input of electronic data is performed in the order entry flow of the output/bookbinding service. First, Row L101 specifies whether or not the electronic data is electronically inputted or physically transmitted and inputted by using a media such as CD-ROM. In case the data is electronically inputted, an input original file name existing within the orderer PC is written in the place of Row L102 or the input file name within the orderer PC is specified by depressing a reference button 22.

Row L103 specifies the number of pages of the input original file. Row L104 specifies an OS when the input original file is prepared. Row L105 specifies a preparation AP when an input file is prepared. Next, when an OK button 23 is depressed, these pieces of information are transmitted to the order management apparatus (output foothold server) 4 through the order entry Web server. In case the input original file is electronically inputted, at Row L102, the specified input original file is also electronically transmitted to the order management apparatus 4 through the order entry Web server. In the meantime, in case the input original file is inputted by a media, the media is delivered to the output foothold by using an inter-office delivery or a home delivery. The orderer performs the input of the electronic data regarding the order thus placed.

FIGS. 24A and 24B are views explaining the copy service on the orderer PC and the order entry flow of the output/bookbinding service. In the case of the copy service button, first, at step S11, the copy service button 14 of FIG. 2 is selected. At step S12, the type of the paper original to be described later in FIG. 3B and a processing at the original reading time are specified. Next, at step S13, the print/bookbinding format to be described later in FIG. 4 is specified. Next, at step S14, a delivery format to be described later in FIG. 25A is specified. Next, at step S15, the order entry information to be described later in FIG. 25B and the orderer information are confirmed, and an order is placed.

Next, in the case of the output/bookbinding service, at step S21, the output/bookbinding service button 12 of FIG. 2 is selected. Next, at step S22, the input method of the electronic data to be described later in FIG. 3A is specified. Next, at step S23, the print/bookbinding format to be described later in FIG. 4 is specified. Next, at step S24, the delivery format to be described later in FIG. 25A is specified. Next, at step S25, the order entry information to be described later in FIG. 25B and the orderer information are confirmed and a temporary order is placed. Next, at step S26, the procedure stands by until a proof print for confirming the print result is delivered, and after confirming the proof print, at step S27, the proof is approved by telephone and mail. This approval of the proof and the print are performed in such a manner that, for example, in the case of 100 copies of the print, one copy only is printed, and after having confirmed whether or not a color and a format are consistent with the orderer's intention, the remaining 99 copies are printed. While a description on the order entry flow in the case of the scan service has been omitted, the same setup as the copy services at steps S12, S14, and S15 are performed.

FIG. 3B is a screen of the orderer PC on occasion when specifying the processing at the inputting and reading time of the paper original in the order entry flow of the copy service and the scan service. First, Row L201 distinguishes whether or not the original is a bound book original or a sheet original and specifies a size of the original. In FIG. 3B, the book original of an A4 size is selected. Row L202 specifies whether a color scan is made or a monochrome scan is made. Row L203 specifies whether a document is single-sided or double-sided. Row L204 specifies whether or not the process such as a tilt correction, a dust removal, a punch trace removal, and the like is performed at the scan time.

Similarly in the following, Row L205 specifies a setup regarding what format must be taken for the scanned image data. Row L206 specifies a setup of the reading resolution. Row L207 specifies a setup of the number of pages. Row L208 specifies a setup as to whether the scanned image data is transmitted by E-mail or is put into a shared folder or put into a media and transmitted. Row L209 specifies the setup of the destination. The orderer thus inputs a paper original regarding the order, and at the same time, the client specifies the processing at the reading time.

FIG. 4 is a screen specifying a print/bookbinding service format in the order entry flow of the copy/output/bookbinding service. Row L301 specifies a print finishing size, and in FIG. 4, the A4 size is selected. Row L302 specifies whether the print is made by color or monochrome. Row L303 specifies whether the print is one-side print or a both-side print. Row L304 specifies the type of the sheet used for print.

Similarly in the following, Row L305 specifies a setup regarding a cover sheet print. Row L306 specifies a setup of a bookbinding-format as to how the printed paper is bound. Row L307 specifies a setup regarding a punch processing for printed papers. Row L308 specifies a setup regarding the cutting processing of the edge for printed papers. Row L309 specifies a setup regarding the number of pages. The orderer thus specifies a print/bookbinding format for the order thus placed.

FIG. 25A is a screen for performing a delivery format specification in the order entry flow of the copy service and an output/bookbinding service. First, Rows L401, L405, L409 are specifications as to in which method the output matter of the copy service and the output/bookbinding service are delivered to the orderer, and Row L401 is selected in the case of dispatch by an inter-office delivery, Row L405 is selected in the case of dispatch by a home-delivery, and Row L409 is selected in the case of the orderer coming to a foothold for pickup. Rows L402 to L404 specify the setups regarding the destination in the case of dispatch by the inter-office delivery, and Rows L406 to L408 specify the setups regarding the destination in the case of dispatch by the home delivery. Row L410 specifies the setup regarding a pickup schedule date in case the orderer comes for pickup. The orderer specifies the delivery format regarding the order thus placed.

FIG. 25B is a screen for performing order entry confirmation in the order entry flow of various services. First, Row L501 shows the type of a service to be ordered, Row L502 shows a display of rough estimate of the service to be ordered, and Row L503 is entered with a desired delivery data. Rows L504 to L509 show confirmation displays of information regarding the orderer. The orderer confirms the content, and depresses an OK button 31. Then, the order entry of the service is performed.

<Processing of Order Entry Acceptance System>

Figure 5A:
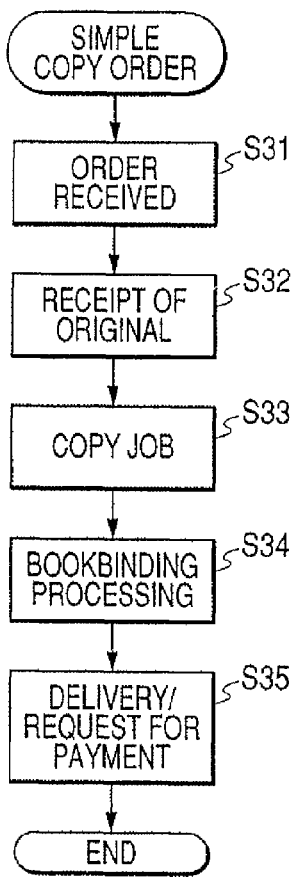
FIGS. 5A, 5B and 5C are views explaining a processing flow of a copy/print order received.
Figure 5B:
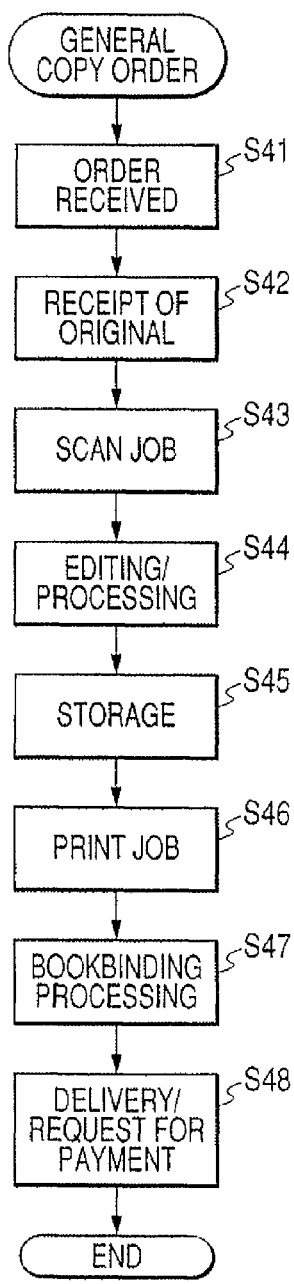
Figure 5C:
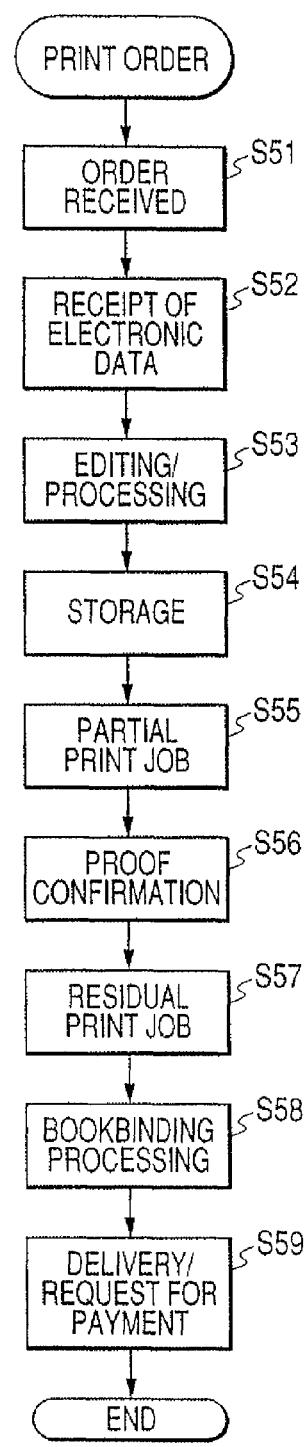

FIGS. 5A to 5C are views explaining a processing flow of the copy/print order received by an order management apparatus 4. The received copy order is classified into a simple copy order which may simply copy by a copier and an ordinary copy order which scans by scanner and electronically performs an editing processing, and after that, performs a copy by printing. For example, the order selecting "no process" at Row L204 of FIG. 3B is taken as a simple copy order, and the order which selects "process available" is taken as an ordinary copy order. The simple copy order, first, performs an order entry at step S31, and at step S32, the procedure stands by until the paper original is delivered. At step S33, a copy job for copying the delivered paper original by a copying machine is executed, and at step S34, a bookbinding such as a wrapping binding, binding with saddle stitch, and the like is performed. Next, at step S35, the bound book is delivered to the specified address, and a request for payment is made.

Next, in the case of the ordinary copy order, at step S41, the order entry is made, and at step S42, the procedure stands by until the paper original is delivered. At step S43, the scan job for scanning the delivered paper original by scanner is executed, and at step S44, the process processing such as a tilt correction, a dust removal, a punch hole removal, and the like is performed for the scanned image data. At step S45, the image data processed for a later reorder is stored as occasion demands. At step S46, a print job for performing a print by printer is executed, and at step S47, a bookbinding process such as a wrapping binding, a binding with saddle stitch, and the like is performed. At step 48, the bound book is delivered to the specified address, and a request for payment is made.

With regard to each copy order thus received, there are the case where the operator processes it as an individual copy job, and the case where the operator processes it for every process job such as a scan job, an editing process job, and a print job. In the present embodiment, an individual service ordered by the orderer is taken as an "order", and to execute this order, an individual work to be processed by each operator is set up by the manager PC 10. This individual work is referred to as a "process job" and is distinguished as such.

Next, in the case of the print order, at step S51, an order entry is made, and at step S52, the electronic data is received through the order entry server or the procedure stands by until the media is delivered. At step S53, an editing/process processing such as a page numbering, a imposition or a color correction, and the like is performed to the received data. Next, at step S54, the electronic data treated with editing/process for a later reorder is stored as occasion demands. At step S55, a print job for performing one copy of a proof print by printer is executed, and at step S56, that proof print is delivered to the orderer so as to obtain a proof approval. At step S57, the remaining copies of the print is performed, and at step S58, the bookbinding process such as a wrapping binding, a binding with saddle stitch, and the like is performed. Next, at step S59, the bound book is delivered to the specified address, and a request for payment is made.

Figure 6:
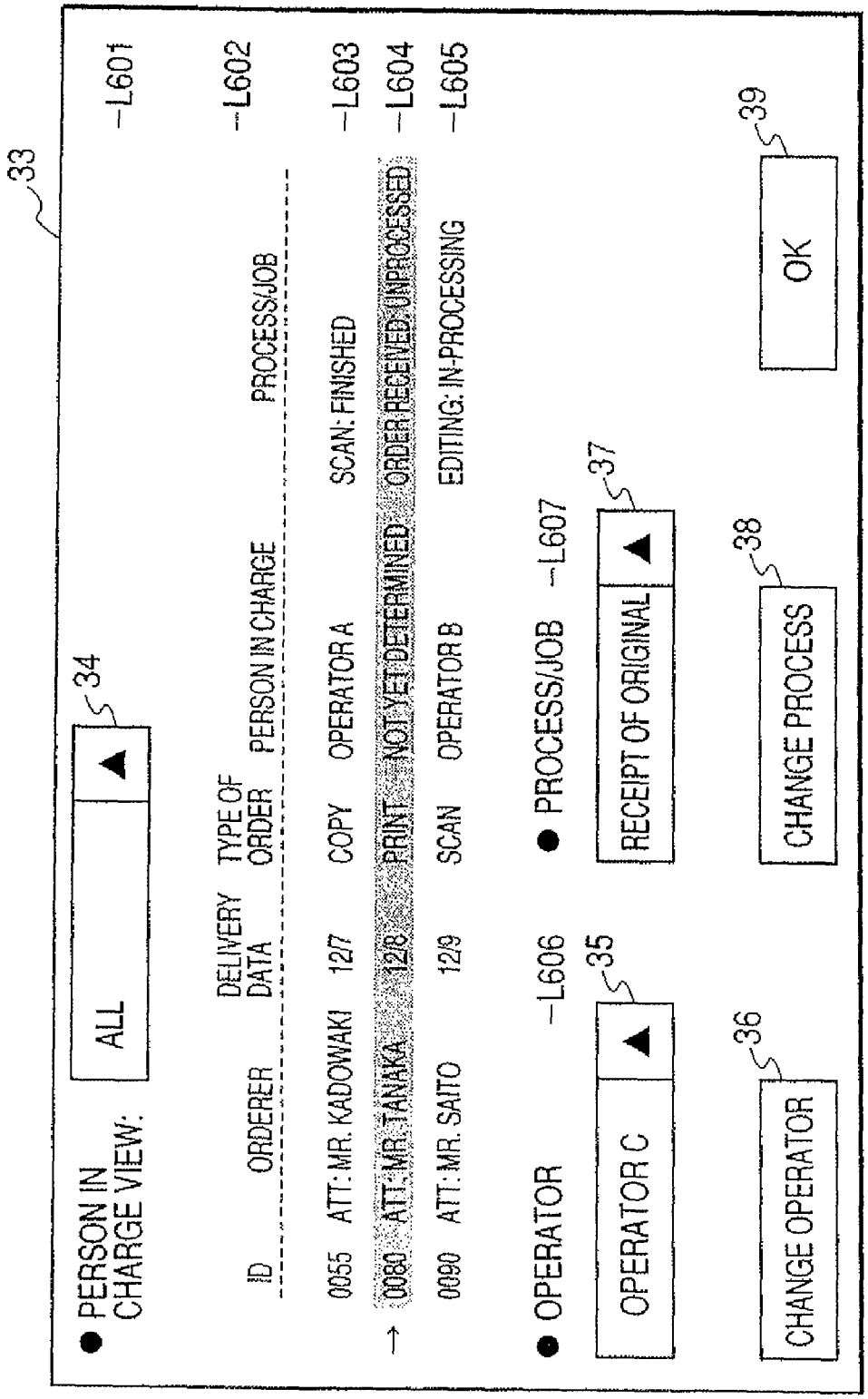
FIG. 6 is a screen of an access soft from a manger PC to an order management apparatus 4.

FIG. 6 is a screen of the access soft from the manger PC 10 to the order management apparatus 4 in the first embodiment. In this screen, the manager confirms the state of each order, and at the same time, changes each process/job of each order, and allots an operator for processing the process/job. The operator referred to in the present embodiment means a person in charge who executes the process/job.

FIG. 26 is a view explaining a processing flow of the scan order received. In the case of the scan order, at step S61, an order entry is made, and at step S62, the procedure stands by until a paper original is delivered. At step S3, the scan job is executed for the delivered paper original, and at step S64, the process processing such as a tilt correction, a dust removal, a punch hole removal, and the like is performed for the scanned image data. Next, at step S65, the image data processed for a later reorder is stored as occasion demands. Next, at step S66, the processed original is delivered to the specified address, and a request for payment is made.

Numeral 34 in FIG. 6 denotes a pull down list for selecting which process/job of which operator is displayed in the display unit of the manger PC. For example, when the control unit of the manger PC 10 recognizes that a "operator A" is selected, a view of the process and the process job allotted to the operator A is displayed in the display unit connected to the manger PC 10. Further, when an "All" is selected, as shown in FIG. 6, a view of information on the processes not allotted to any operator and all the processes including the process jobs and the process jobs is displayed.

Row L602 shows display items of information on each process and process job, and an order ID of the order including the information on the process job, an orderer of the order, a delivery data of the order, a type of the order, a person in charge of the information on the process job, and a processing state of the current processes and process jobs are displayed in the display unit connected to the manger PC 10. Row L603 shows a display of the content of the order ID "0055", and Row L604 shows a display of the content of an order ID "0080". From among the orders displayed, an order taken as an operation target selected by the manger is recognized by the control unit of the manger PC 10. In FIG. 6, the control unit recognizes Row L604 as selected. In case the person in charge of the selected order is desired to be changed, a new operator is selected from the pull down list of Numeral 35 located in FIG. 6, and an operator change button 36 is depressed.

Further, in case the process of the selected order is desired to be changed, a new process is selected from the pull down list of Numeral 37 located in FIG. 6, and a process change button 38 is depressed. The manager controls the progressive situation of each process job of each order, and advances the process according to the progressive situation, and allots a new person in charge (operator).

Figure 13:
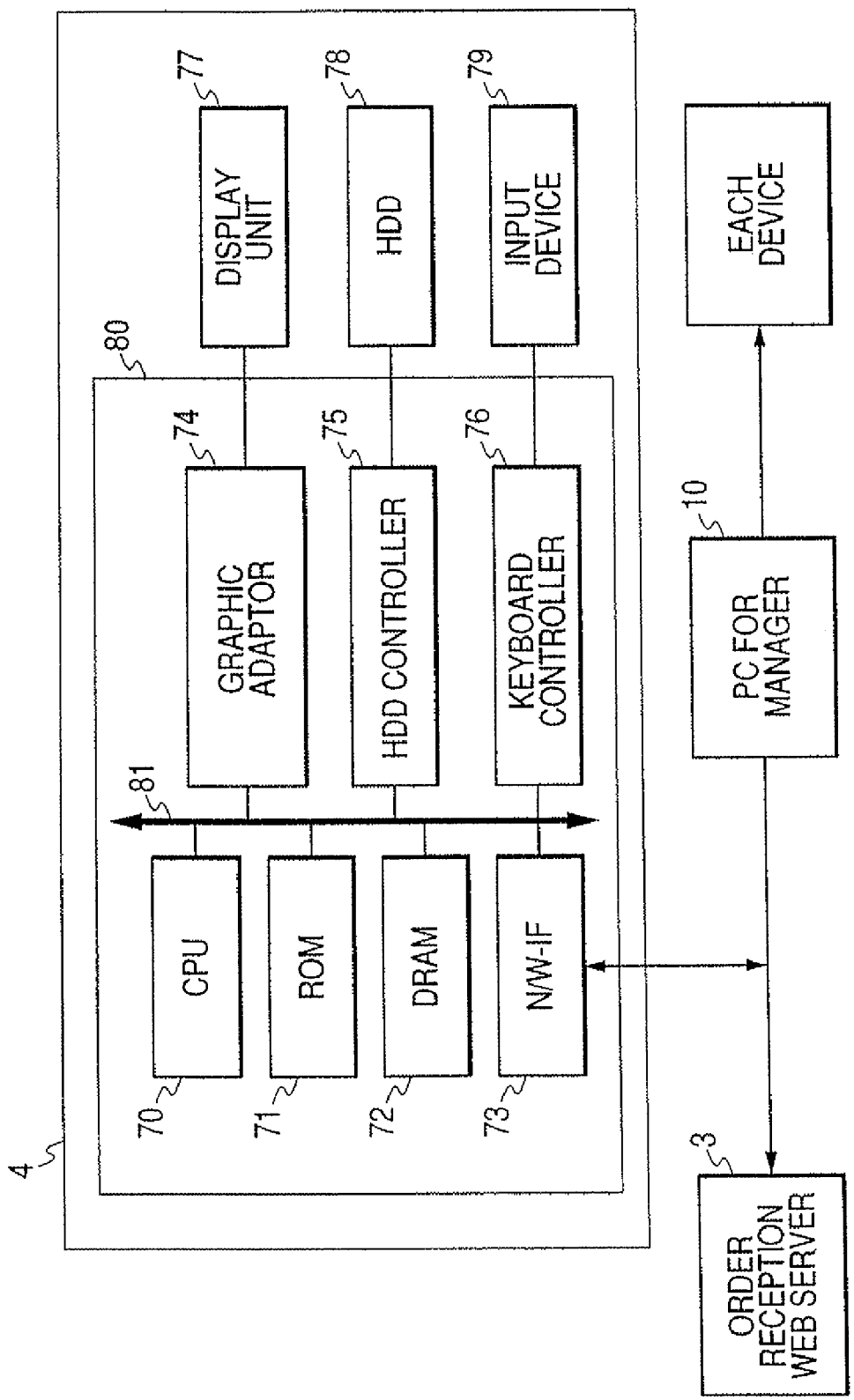
FIG. 13 is a block diagram of an order management apparatus.

FIG. 7 is a view explaining an order management information storage unit. The information regarding the order received by the order entry Web server is transmitted to the order management apparatus 4, and the information regarding each order is controlled in a concentrated manner in a DRAM 72, which is a storage unit of the order management apparatus 4. A block diagram showing the configuration of the order management apparatus 4 is shown in FIG. 13. First, in FIG. 7, the first order 42 is for a scan order. Row L701 shows an order ID, Row L702 an order data, Row L703 a delivery data, Row L704 a type of order, Row L705 the current person in charge, and Row L706 the current process/process job. Rows L701 to L706 are order progress control information.

Row L707 shows a type of the original, Row 708 a size of the original, and Row L709 a type of color/monochrome original. Rows L709 to L711 show information on the original. Next, Rows L712 to L713 show a processing method of the process format of the scanned image data. Row L715 shows the scanned image data. Row L716 shows information on the destination of the scanned image data, and Rows L718 to L719 show the name and contact address of the orderer.

Next, the second order 43 is for a print order. Similarly to the first order 42, the order management information storage unit controls various pieces of order information, which are stored by the storage unit of the order management apparatus 4.

As described above, since the process jobs stored by the order management information storage unit 45 include the processing method which is the setup information on occasion when the process format at the scan time and the print format at the print time are processed in the image processing apparatus, all the operator need to do is just to receive information on the process job in charge by himself, and there is no need to set up the processing method by using the operation unit of the apparatus, and the operability is considered as improved. The setup content of the processing method set up here is set up by the orderer at the order entry time, and this is displayed as an order entry parameter in the operation unit of the image processing apparatus.

<Configuration of Image Processing Apparatus in First Embodiment>

Figure 8:
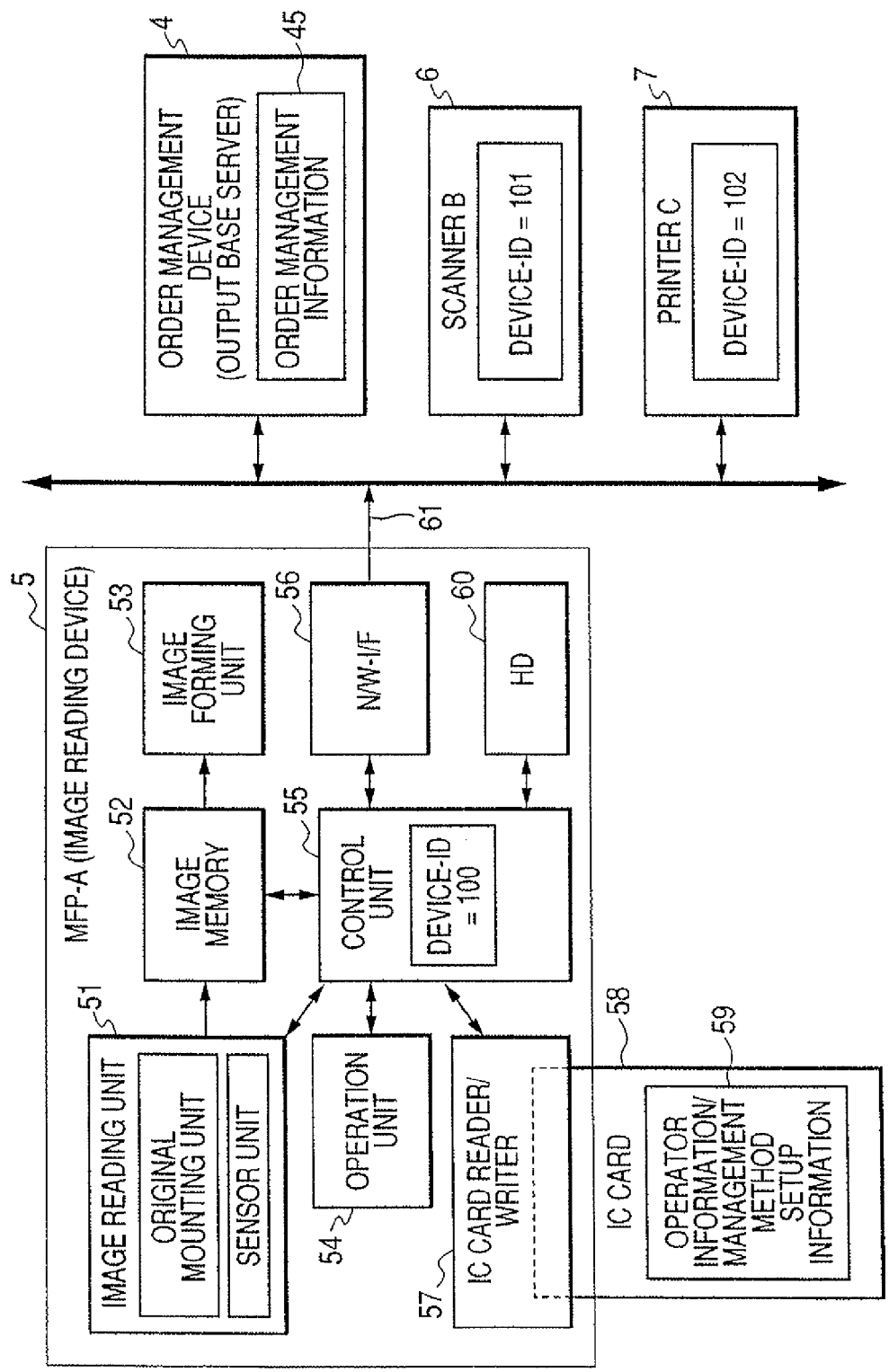
FIG. 8 is a block diagram of an image processing apparatus in a first embodiment.

FIG. 8 is a block diagram of an image processing apparatus 5 equivalent to the apparatus in the first embodiment. First, an image reading unit 51 reads an original loaded to an image loading unit and generates an image data, and stores it in an image memory 52. The data stored in the image memory 52 is transmitted to the PC of the orderer or the PCs of the order management apparatus 4 and each operator through a network I/F 56 and a network 61.

The print job received from the order management apparatus 4 is developed as a bit map data on the image memory, and is printed in an image forming unit 53.

At the copy time, the image data read by the image reading unit 51 is printed in the image forming unit 53, and the copy is executed. A control unit 55 performs a control of the whole apparatus, and interiorly stores an apparatus ID which is identification information on the image processing apparatus 5. An IC card reader writer 57 is for reading and writing the content of an IC card 58 for each operator. The IC card for each operator is stored with operator information and processing method setup information 59. A HD 60 is for storing a long-term or a short-term data and a program. An operation unit 54 is for performing various operations by the operator. A liquid crystal display unit disposed with a touch panel on its surface configures the operation unit 54. Other apparatuses are also connected on the network, and each apparatus has a different apparatus ID.

While the image processing apparatus in the present embodiment, as shown in FIG. 8, is a complex machine comprising the image reading unit and the image forming unit, an apparatus comprising either the image reading unit or the image forming unit is also handled as an image processing apparatus.

<Configuration of IC card>

FIG: 9 is a view explaining operator information and processing method setup stored within each IC card of each operator. The information to be described later is stored in a rewritable storage unit within the IC card. Row L801 shows an operator ID which is an identification information on the operator, and Row L802 shows an operator name. Row L803 shows a password 1 for determining whether or not the operator is a legitimate owner of the IC card. Row L804 shows a second password in case of performing the certification of the IC card by the order management apparatus 4. Since the password 2 is not to be inputted by the operator, a complicated password having a large number of digits can be used.

Row L805 shows an affiliation of the operator, and Row L806 shows a contact address of the operator. Rows L807 to L814 are for setting up in advance a processing method in case this operator uses the apparatus of an apparatus of ID=100. First, Row L808 shows an apparatus ID of the target apparatus, and Row L809 shows its apparatus, and displays a type of the process job processed by the operator having this IC card. In the present embodiment, since the apparatus ID=100 shows a complicated machine comprising scanner, copy, and printer functions, the scan job, the copy job, and the print job can be processed.

Next, Row L810 specifies whether or not the tilt correction of the read image data is executed by using the complication machine (apparatus ID=100) in case the scan job is processed by this apparatus. Depending on a type of the apparatus, there are cases where the tilt correction function is not available or even if the tilt correction function is available, its accuracy is low. In such cases, there are instances where the tilt correction is not performed by the scanner apparatus, but a scan data is transmitted to the PC, and the tilt correction is made on the PC, thereby obtaining a good result. Hence, the operator performs in advance the specification of Row L810 according to the preference of the operator and the capacity of each apparatus.

Row L811 specifies whether or not an OCR processing is executed by this MFP (apparatus ID=100) in case the scan job is similarly processed. Similarly, while Row L812 specifies whether or not a stable processing is executed by using this apparatus (apparatus ID=100) at the print time, according to the staple function of the apparatus, there is a limit on the number of sheets capable of stapling, and in case the number of sheets involved is large, there are instances where the stapling is performed by using another finisher, thereby obtaining a good result. Hence, the operator performs in advance the specification of Row L812 according to the preference of the operator and the capacity of each apparatus.

Row L813 and Row L814 similarly specify whether or not a punch processing and a cutting processing at the print time are executed by the apparatus. Similarly, Rows L815 to L819 are for setting up in advance the processing method in case this operator uses the apparatus of the apparatus ID=100, and Rows L820 to L825 are for setting up in advance the processing method in case this operator uses the apparatus of the apparatus ID=102.

<Operation in Operation Unit of Image Processing Apparatus in First Embodiment>

FIG. 10 is a display screen of the information on the process job in the apparatus operation unit in the first embodiment. When the operator loads his own IC card to the apparatus, as shown in FIG. 10, the process job in charge of the operator having the IC card, and moreover, the information on the process job processed by using the present apparatus are displayed in the apparatus operation unit.

The information on the process job displayed can be selected by a scan job view button 67, a copy job view button 68, a print job view button 69, and all job button 70. When the control unit 55 of the image processing apparatus recognizes a button selected by the operator, according to the selection, the information on the process job displayed to the apparatus operation unit 54 is changed. For example, the state of FIG. 10 is a display state in case all process job view 70 is selected, and the "all" is displayed also in Row L901. In the present embodiment, when the control unit 55 of the image processing apparatus recognizes that "all job view" is selected, Rows L904 to L907 are displayed with the information on the process job regarding the operator A loaded with the IC card and all the information on the process job processable by using the present apparatus.

This display sequence is sort-displayed by depressing a sort button 71 by a delivery data and a sort button 72 by a type of the process job for each item. The operator selects the process job to be executed from this list of process jobs by depressing up and down keys 63 or 64. In FIG. 10, a state in which the scan job of the copy order of an order ID "0055" is selected is displayed. When a process job is selected and a selector button 65 is depressed, the screen is shifted to the detailed information screen of each process job to be described later by FIGS. 11 to 12.

Further, in case a sensor unit of the original loading unit detects that an original is loaded on the original loading unit of the image reading unit 51, the fact that the original is loaded on the original loading unit is notified to the control unit 55 of the image processing apparatus form the sensor unit, and the control unit 55 recognizing this information preferentially displays it in the operation unit 54 so that the scan job and the copy job are processed faster than the print job since there is every possibility of the scan or copy processing being performed by the operator. Specifically, the list of the display sequence is changed so that the start of the display sequence becomes the scan or copy job.

By so doing, the information on the process job about to be executed by the user is automatically displayed at a position easily recognizable by the operator, and therefore, even in case the information on a large number of process jobs is displayed in the operation unit, it is relatively easy to detect the information on the process jobs scheduled to be processed.

FIG. 11 is a detailed display screen of the scan job in the operation unit 54 of the image processing apparatus to be shifted in case the control unit 55 recognizes that the order ID "0055" which is a scan job in FIG. 10 is selected. Numeral 74 of FIG. 11 is displayed with general information in case a scan job of Row L904 is selected from among the pieces of information on the process job displayed in the operation unit 54 of FIG. 10. Next, each parameter such as a type of the original, a size of the original, a color or monochrome classification of the original, one side or both side classification of the original, a name of the original, and the like specified by the orderer regarding the scan job in the area of Numeral 75 is recognized by the control unit 55 and is displayed in the operation unit 54.

The area of Numeral 76 of FIG. 11 is displayed with execution parameters which are the processing method in case the scan job is actually performed. Numeral 77 of FIG. 11 is displayed with keys for changing each parameter. When the changing target is selected by a left to right key (not shown), the key which became the changing target is reversed, and in that state, when the left to right key (not shown) is depressed, other setup values of each setup item are displayed in the place of Numeral 76. Usually, while the parameters at the order entry time located in the place of Numeral 75 are recognized by the control unit 55, and are automatically copied to the area of Numeral 76, in case the orderer makes a wrong order or the like, the operator operates the keys of Numeral 77, so that each parameter can be changed. Speaking of the example of FIG. 11, in case the orderer specifies his original as a book original, but the delivered original is a sheet original, an execution value is changed to a sheet original by the operator, and the control unit 55 which recognizes the change renews a display content of the display unit 54.

Further, while the orderer specifies a PDF+OCR processing as a format, in case the control unit 55 recognizes that no execution of the OCR processing by this apparatus by this operator is selected in Row L811 of the processing method setup information as described in FIG. 9, an execution value is automatically changed to a PDF only. However, even in case the execution value is automatically reflected as a default value, it is possible to change the value by the operator by the key in Numeral 77. Further, in case the value is not reflected in the execution value of the image processing apparatus, after performing a scan by this image processing apparatus, by using a PC of another apparatus (operator PC 9-1 or operator PC 9-2), an OCR processing and a punch processing are executed. Further, with regard to the destination, in the case of a simple scan job, while it is transmitted by mail and the like to the orderer as it is from the apparatus, in the case of a complicated scan job requiring the process, the scanned image data is once transmitted to the PC of the operator A, and the process work may be performed on the PC by the operator A, and in that case, the destination is changed to the operator A.

After having confirmed various types of parameters and having performed corrections as required, when a setup storage button 79 is depressed, storage information stored in the order management information storage unit 45 within the order management apparatus 4 described in FIG. 7 is renewed. Next, when a scan execution is performed, a scan is executed according to the parameters of Numeral 76 specified as an execution value, and the scan data is transmitted to the specified destination. Further, the number of pages of the original is counted by a document feeder (not shown), and the value actually read is reflected in the execution value.

Since the parameters thus specified by the orderer can be automatically set up as the execution value, the trouble of inputting each time by the operator can be saved. Further, in case the processing method setup information specified in the IC card and the parameters specified by the orderer are different, the processing method setup information specified in the IC card is given a preference, and the execution parameters are automatically changed.

Further, the operator can determine whether or not the parameters specified by the orderer such as a type and a size of the original, one side or both-sides and the like are correct at a site of the apparatus immediately before performing the scan, and can make corrections on the spot.

Figure 12:
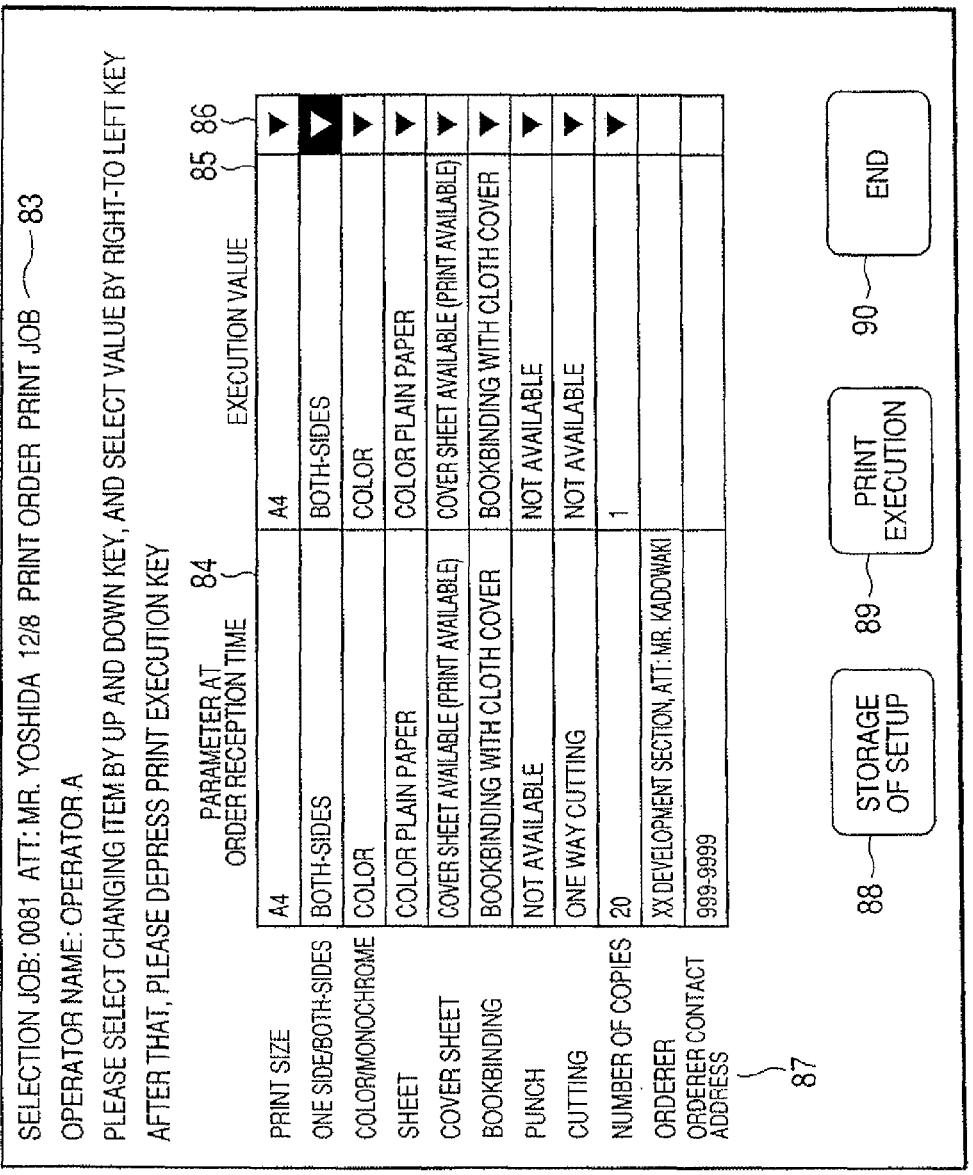
FIG. 12 is a detail display screen of information on a print process job in the operation unit of the image processing apparatus.

FIG. 12 is a detail display screen of the print job in the apparatus control unit, which is shifted when an order ID "0081" being a print job in FIG. 10 is selected. While its configuration is the same as FIG. 11, the execution parameters being the processing method for print are displayed. Further, the setup regarding a finishing processing such as a punch cutting, a cutting setup, and the like can be automatically reflected as it is in the execution value of this apparatus according to the setup similarly to Rows L812 to L814 of the processing method setup information described in FIG. 9. In case the setup is not reflected in the execution value of this apparatus, after the print by this apparatus, by using the finisher of another apparatus, the punch processing and the cutting processing are executed.

When various types of parameters are confirmed in FIG. 12 and, after performing corrections as required, when the setup storage button is depressed, the storage information stored in the order management information storage unit 45 within the order management apparatus 4 described in FIG. 7 is renewed, and on occasion when a reprint is executed, the print is executed according to the parameters specified as the execution value.

While being omitted in the present embodiment, with regard to the copy job, the same processing as FIGS. 11 and 12 is performed.

The order entry parameters as shown in FIGS. 11 and 12 are the parameters set up by the orderer of the order at the order entry time, and these parameters are automatically reflected as the execution parameters of the apparatus. This allows the operator to have no use for setting up all the execution parameters of the apparatus, and all he needs to do is to change only what he desires to change according to the state of the apparatus, and this leads to the improvement of the operability.

FIG. 26 is a detail display screen of a delivery voucher print job in the apparatus control unit, which is shifted when a delivery job is selected in FIG. 10. While the configuration thereof is the same as FIG. 11, parameters for use of the delivery voucher print are displayed. In FIG. 26, after having confirmed various types of parameters and having performed corrections as required, when the setup storage button is depressed, the order management information within the output foothold server as described in FIG. 7 is renewed. Next, when the delivery voucher print execution is performed, the delivery voucher print is executed according to the parameter specified as the execution value. For example, the delivery voucher for use in the inter-office delivery, the delivery voucher for a home delivery service man A, the delivery voucher for a home delivery service man B, and the like are printed by this apparatus according to a type of the delivery. The operator dispatches a copy matter a printed matter, and a book binding matter attached with this delivery voucher, and hence, taking a trouble of transcribing the address for delivery becomes unnecessary, and transcription mistakes can be also prevented.

<Configuration of Order Management Apparatus>

A block diagram showing a configuration of the order management apparatus 4 is shown in FIG. 13. The order management apparatus 4 configures the entire order management apparatus 4 including a processing unit 80 and a peripheral apparatus. The processing unit 80 includes a CPU 70 controlling the entire unit 80 according to a control program, a bus 81 mutually connecting system configuration elements, a ROM 71 storing the program executed by the CPU 70, a DRAM 72 for storing an order from the order entry Web server having received the order from the orderer, a graphic adaptor 74 comprising a control function for displaying graphic information in the display unit 77, for example, such as LCD, a keyboard controller 76 for managing the interface with an input apparatus 79 such as a keyboard and the like, and a network I/F 73 being a serial interface for managing communications with the order entry Web server 3 or the manger PC 10.

Further, the processing unit 80 is connected to a display unit 77 for displaying graphic information and the like to the operator through the graphic adaptor 74. Further, the unit 80 comprises a hard disk drive (HDD) 78 being a large capacity storage apparatus stored with programs and data. While a description has been made in FIG. 13 that the order management apparatus 4 is connected to the manger PC, the order management apparatus 4 itself may be the manager PC.

<Control Flow 1 in Image Processing Apparatus>

Figure 14:
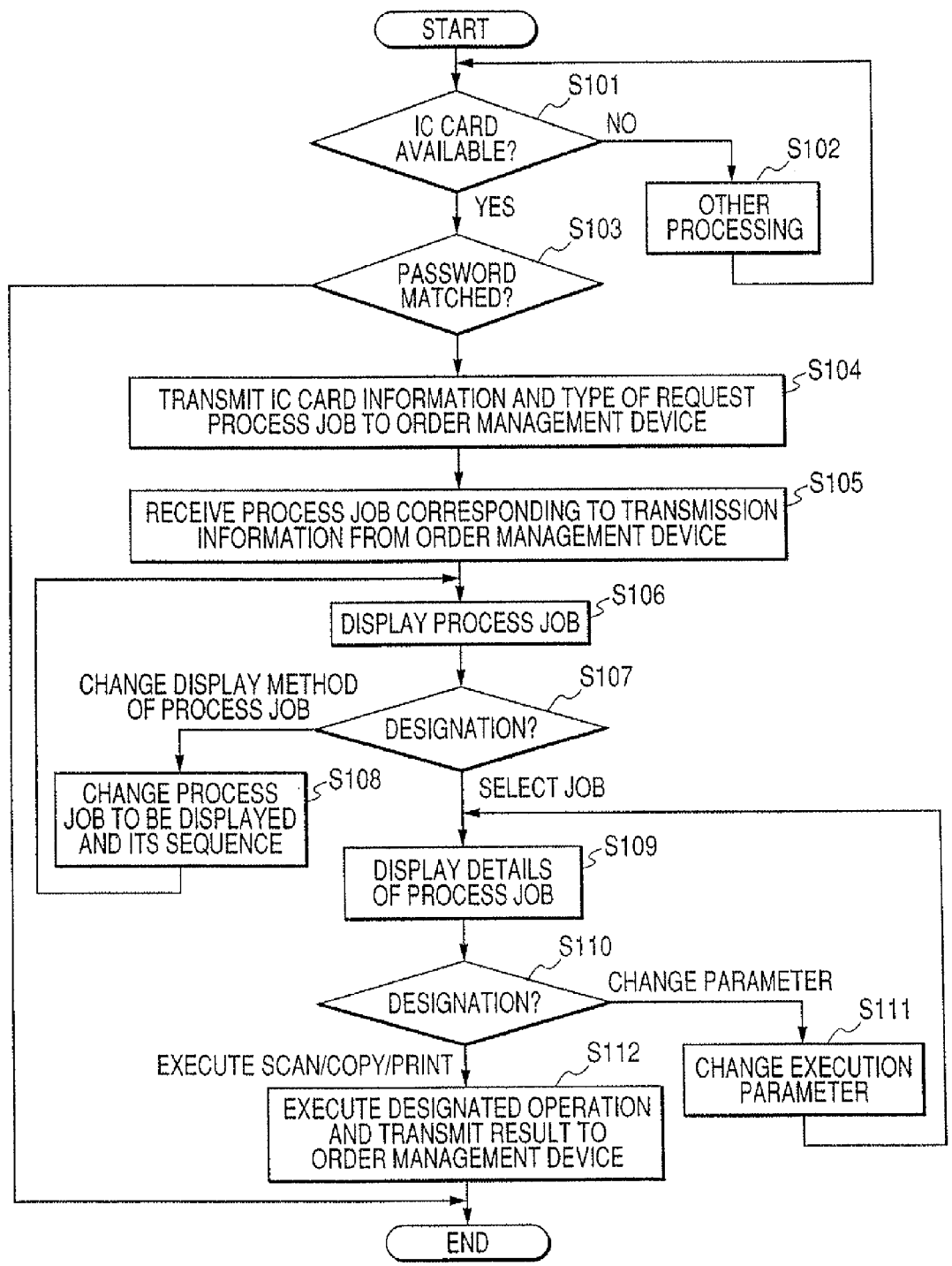
FIG. 14 is a flowchart of the image processing apparatus in the first embodiment.

FIG. 14 is a flowchart for explaining a control flow of an image processing apparatus 5 in the first embodiment. The processing of each step is performed by the control unit 55 for controlling the entire apparatus of the image processing apparatus 5.

When the control unit 55 recognizes that the apparatus is activated by the user, it determines whether or not the IC card 58 is loaded to an IC card reader writer 57 (S101). When the IC card is not loaded, another processing is performed (S102), and the procedure returns to step S101. Another processing referred to here means an ordinary copy or a scan processing other than the processing using the IC card in the present embodiment.

At step S101, in case the control unit 55 recognizes that the IC card 58 is loaded to the IC card reader writer 57, the information on the IC card read by the IC card reader writer 57 is transmitted to the control unit 55. The control unit 55, which recognizes the information on the IC card, displays a screen in which the password 1 is inputted into the operation unit 54. The control unit 55 recognizes the password 1 inputted into the operation unit 54 of the image processing apparatus by the operator, and compares the inputted password 1 and the password 1 stored within the IC card, and determines whether or not the inputted password 1 and the password 1 within the IC card are matched (S103).

As a result of the comparison, in case the control unit 55 determines that the inputted password 1 and the password 1 within the IC card are matched, the apparatus ID of the image processing unit loaded with the IC card by the operator and the information on the IC card are transmitted to the order management apparatus 4 by the control unit 55 through the network I/F 56 (S104: S104 is equivalent to transmitting means and transmitting process referred to in the present embodiment). The IC card information transmitted at step S104 may be at least an operator ID displaying identification information on the operator who operates the image processing apparatus. The type of the information on the process job required at S104 is the information on the process job processable by the operator in each apparatus within the processing method setup information as described in FIG. 9 which is within the IC card for each operator. Speaking of the example of FIG. 9, in case the operator A loads the IC card to the image processing apparatus of the apparatus ID=100, and a request for acquisition of the information on the process job is made from the control unit 55 of the image processing apparatus of the apparatus ID=100 to the order management apparatus, this is equivalent to a request for all of the scan job, the copy job and the print job in charge of the operator A made to the order management apparatus 4 according to the setup of the Row L809 of FIG. 9.

In the meantime, in case the operator A loads the IC card to the image processing apparatus of the apparatus ID=101 and makes a request for the acquisition of the information on the process job from the control unit 55 of the image processing apparatus of the apparatus ID=101 to the order management apparatus 4, this is equivalent to a request for all scan jobs in charge of the operator A according to the setup of Row L817 of FIG. 9.

The control unit 55 acquires the information on the process job responding to the information transmitted at step S104 from the order management apparatus 4 through the network I/F 56 (S105: S105 is equivalent to acquiring means and acquiring process referred to in the present embodiment). The information on the process job acquired at step S105 means either the information on the process job for use of execution or the information on the process job for use of display. While the information on the process job acquired at step S105 means the information on the process job for use of execution, at this stage, the configuration may be such that the information on the process job for use of display is acquired, and after that, the information on the process job for use of execution corresponding to the process job selected by the operator is received, and this configuration will be described later in FIG. 15. Further, the information on the process job for use of execution means electronic data which becomes a basis of the scan and print when the processing is made by using the apparatus, and the processing method at the order time set up by the orderer. As specific examples, Numerals 42 and 43 shown in FIG. 7 can be cited.

Next, to display the information on a plurality of process jobs acquired at step S105 in the operation unit 54, the control unit 55 transmits the information on a plurality of process jobs to the operation unit 54, and displays the information on a plurality of process jobs to be processed by the operator (S106: S106 is equivalent to display control means and display process referred to in the present embodiment). The operation unit 54 has a configuration in which a touch panel is disposed, and the control unit 55 recognizes which operation is specified by the operator (S107).

In case the control unit 55 recognizes that the operation at step S107 is an instruction regarding the change of the display method on the information on the process jobs such as "a view of san jobs", "a view of print jobs", "sort by delivery date" and the like, the information on the process jobs displayed or the display sequence according to that instruction is changed (S108), and the procedure returns to step S106, and renews the display content of the operation unit 54. In the meantime, at step S107, in case the control unit 55 recognizes that any of the displayed information on the process jobs is selected by the operator (equivalent to selecting means and selecting process referred to in the present embodiment), detailed information on the information on the selected process jobs is displayed in the operation unit 54 in the form such as FIGS. 11 and 12 (S109).

Next, the control unit 55 recognizes which operation is instructed by the operator by using the touch panel of operation unit 54 (S110). At step S110, in case the control unit 55 recognizes that the change of various types of execution parameters shown in Numeral 76 of FIG. 11 and Numeral 85 of FIG. 12 are instructed by the operator (S111), the control unit 55 recognizes the parameters changed by the operator, and the procedure returns to step S109 to display the change result in the operation unit 54. In case the change of the parameters is not made by the operator at step S111, as described above, the processing is moved forward according to the parameters at the order entry time or the processing method setup which is set up in the IC card.

In the meantime, at step S110, in case it is recognized that the execution of the scan, the copy, the print and the like is instructed, the process job selected at step S107 is recognized, and an operation is executed (this is equivalent to executing means and executing process referred to in the present embodiment). The execution here means that each process job is processed by using an apparatus corresponding to the current process, and for example, in case the information on the process job in which the current process is a scan is acquired, the processing is performed by the image reading apparatus. In case the change of parameters is made at step S111, the scan, the copy, and the print is executed by way of reflecting the changed parameters. To describe in detail, in case the execution instruction is the scan, the control unit 55 executes the image reading unit 51 according to the execution parameters currently set up. Further, in case the executing instruction is a copy, the control unit 55 executes the image reading unit 51 according to the execution parameters currently set up, and temporarily stores the read image data in the image memory 52. The control unit 55 executes the image data stored in the image memory 52 in the image forming unit 53 according to the execution parameters currently set up, and performs an image forming processing.

In case the control unit 55 recognizes that the execution of the scan, copy, print operations and the like are completed, the unit 55 transmits the execution result to the order management apparatus 4, thereby completing the processing. (S112).

<Control Flow 2 in Image Processing Apparatus>

FIG. 14 is a flowchart for acquiring the information on the process job for use of execution at step S105. However, as another configuration, the configuration may be such that the information on the process job for use of display is acquired from the order management apparatus, and the information on the process job for use of execution corresponding to the process job selected from the information on that process job for use of display is received later. In this case, since the processing content of the image processing apparatus is different from the flowchart of FIG. 14, it will be shown in FIG. 15.

First, since steps S1201 to S1204 are the same as steps S101 to S104 of FIG. 14, the description thereof are omitted. The control unit 55 of the image processing apparatus acquires the information on the process job corresponding to the information transmitted at step S104 from the order management apparatus 4 through the network I/F 56 (S1205). The information on the process job acquired at step S1205 means the information on the process job for use of display to be displayed in the operation unit 54 of the image processing apparatus, and means the information displayed in the operation unit of the apparatus such as Rows L904 and L905 of FIG. 10, and does not include the information on the process job for use of execution.

Next, to display the information on a plurality of process jobs acquired at step S1205 in the operation unit 54, the control unit 55 transmits the information on a plurality of process jobs to the operation unit 54, and displays the information on the process jobs to be processed by the operator (S1206). The operation unit 54 has a configuration in which a touch panel is disposed, and the control unit 55 recognizes which operation is specified by the operator (S1207).

In case the control unit 55 recognizes that the operation at step S1207 is an instruction regarding the change of the display method of the information on the process jobs such as "a view of san jobs", "a view of print jobs", "sort by delivery date" and the like, the information on the process jobs displayed or the display sequence according to that instruction is changed (S1208), and the procedure returns to step S1206, and changes the display content of the operation unit 54. In the meantime, at step S1207, in case the control unit 55 recognizes that any of the displayed information on the process jobs is selected, the information on the process jobs for use of execution corresponding to the information on the selected process jobs is received (S1209). This is a point greatly different from the flowchart of FIG. 14. The advantage of this point will be described later.

Next, the control unit 55 transmits the detail of the information on the process jobs for use of execution received at step S1209 to the operation unit 54 and displays it (S1210), and recognizes which operation is instructed by the operator by using the touch panel of the operation unit 54 (S1211). In case the control unit 55 recognizes that the change of various types of execution parameters displayed in Numeral 76 of FIG. 11 and Numeral 85 of FIG. 12 is instructed by the operator at step S1211 (S1212), the parameters changed by the operator are recognized by the control unit 55, and the procedure returns to step S1210 to display the change result in the operation unit 54. In case the change of the parameters is not instructed by the operator at step S1211, as described above, the processing is moved forward according to the parameters or the processing method setup which is set up in the IC card at the order entry time.

In the meantime, at step S1211, in case it is recognized that the execution of the scan, the copy, the print and the like is instructed, the information on the on process job for use of execution received at the step S1209 is recognized and, and an operation is executed. In case the change of parameters is performed at step S1212, the scan, the copy, and the print are executed by way of reflecting the parameters having been changed.

In case the control unit 55 recognizes that the execution of the scan, copy, print operations and the like are completed, the unit 55 transmits the execution result to the order management apparatus 4, thereby completing the processing (S1213).

While, in the flowchart of FIG. 14, while the information on the process job for use of execution has been received at the point of time of S105, in the present flowchart, the information on the process job for use of display is once acquired, and the information on the process job for use of execution corresponding to the process job selected from the information on that process job is received. In this manner, in the flowchart of FIG. 14, while the operator loaded with the IC card has received all the information on the jobs for use of execution processed by using the present image processing apparatus, in the flowchart of FIG. 15, only the information on the process jobs for use of execution selected by the operator can be received, and this leads to the saving of the HD 60 being the storage unit of the image processing apparatus and the reduction in the amount of transmission and reception data of the network.

As described above, in the first embodiment, the information on the process job displayed in the operation unit of the apparatus is a process job in charge of the operator carrying the IC card, and the information on the process job processable by the apparatus loaded with the IC card is displayed. In this manner, the operator can keep track of the process job in charge of himself by the operation unit only of the apparatus without moving back and force between the PC loaded with the workflow system and the apparatus.

<Process Job Transmission Flow in Order Management Apparatus>

Figure 16:
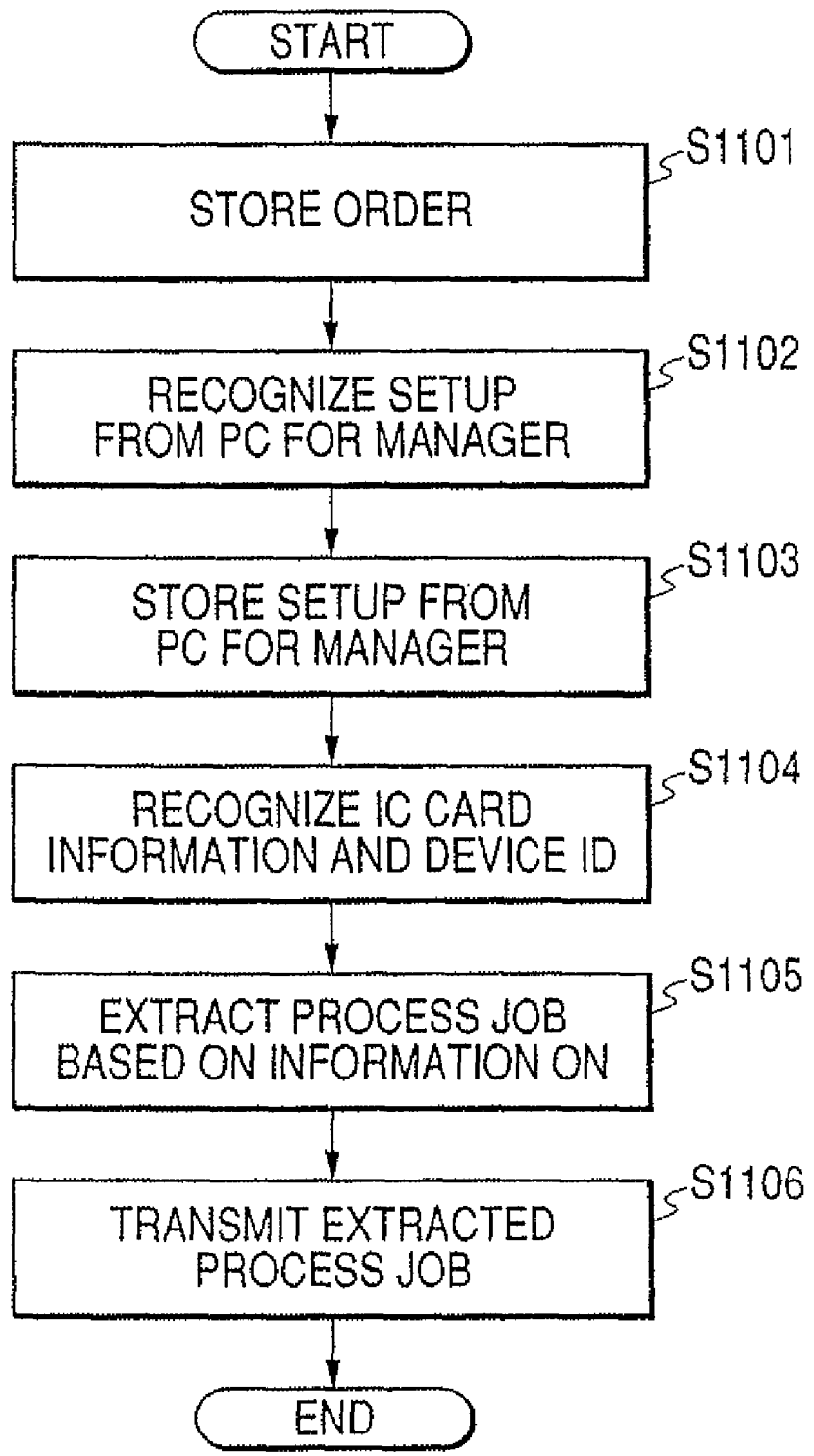
FIG. 16 is a flowchart regarding the process job transmission of the order management apparatus 4.

Subsequently, a flow on occasion when the information on the process job is transmitted from the order management apparatus 4 to the image processing apparatus will be described in FIG. 16.

The CPU 70 of the order management apparatus 4 receives an order from the orderer received by the Web server 3 through the network I/F 73, and stores it in the DRAM 72

(S1101). Subsequently, from the order stored at step S1101 by the manger PC 10 connected with the order management apparatus 4, the process job of each work processed by each operator is generated, and that process job is recognized by the CPU 70 of the order management apparatus 4 (S1102). The information recognized at step S1102 means the information on the operator in charge of the processing of each process job allotted by the manager PC 10, the progressive information of each order changed by the manger PC 10 and the like. The information recognized at step S1102 is stored by the order management control storage unit 45 within the order management apparatus 4 by way of a form as shown in FIG. 7. To described in detail, the DRAM 72 of the order management apparatus 4 stores the information.

The CPU 70 of the order management apparatus 4 receives the apparatus ID and the IC card information transmitted from the image processing apparatus at step S104 of FIG. 14, and recognizes the content of each information (S1104). Based on the information recognized at step S1104, the CPU 70 extracts the information on the process job corresponding to the information included in the apparatus ID and the IC card from the DRAM 72 stored at steps S1103 (S1105). The information on the process job extracted here means the information on the process job for use of execution actually executed in the image processing apparatus or the information on the process job for use of display which is displayed in the operation unit 54 of the image processing apparatus.

Based on this information on the IC card and the apparatus ID recognized at step S1104, the information on the process job processable by the operator by using the image processing apparatus of the transmitting source is extracted from the DRAM 72. Here, to have a better understanding about the present steps, a description will be made by using a specific example.

For example, in case the operator A loads the IC card of FIG. 9 to the image processing apparatus of the apparatus ID=101, the information recognized by the CPU 70 of the order management apparatus 4 is the information on the IC card of FIG. 9 and the apparatus ID=101 of the transmitting source. In case the apparatus ID=101 is used for the IC card of FIG. 9, it is described that the scan only can be executed. Hence, the CPU 70 of the order management apparatus 4, which recognizes the information on the IC card and the apparatus ID, extracts the scan job only in charge of the operator A from the information on the process job stored at step S1103 from the DRAM 72, because the transmitted apparatus ID is the apparatus ID=101 which processes the scan job only.

The CPU 70 transmits the information on the process job extracted at step S1105 to the image processing apparatus through the network I/F (S1106).

Figure 15:
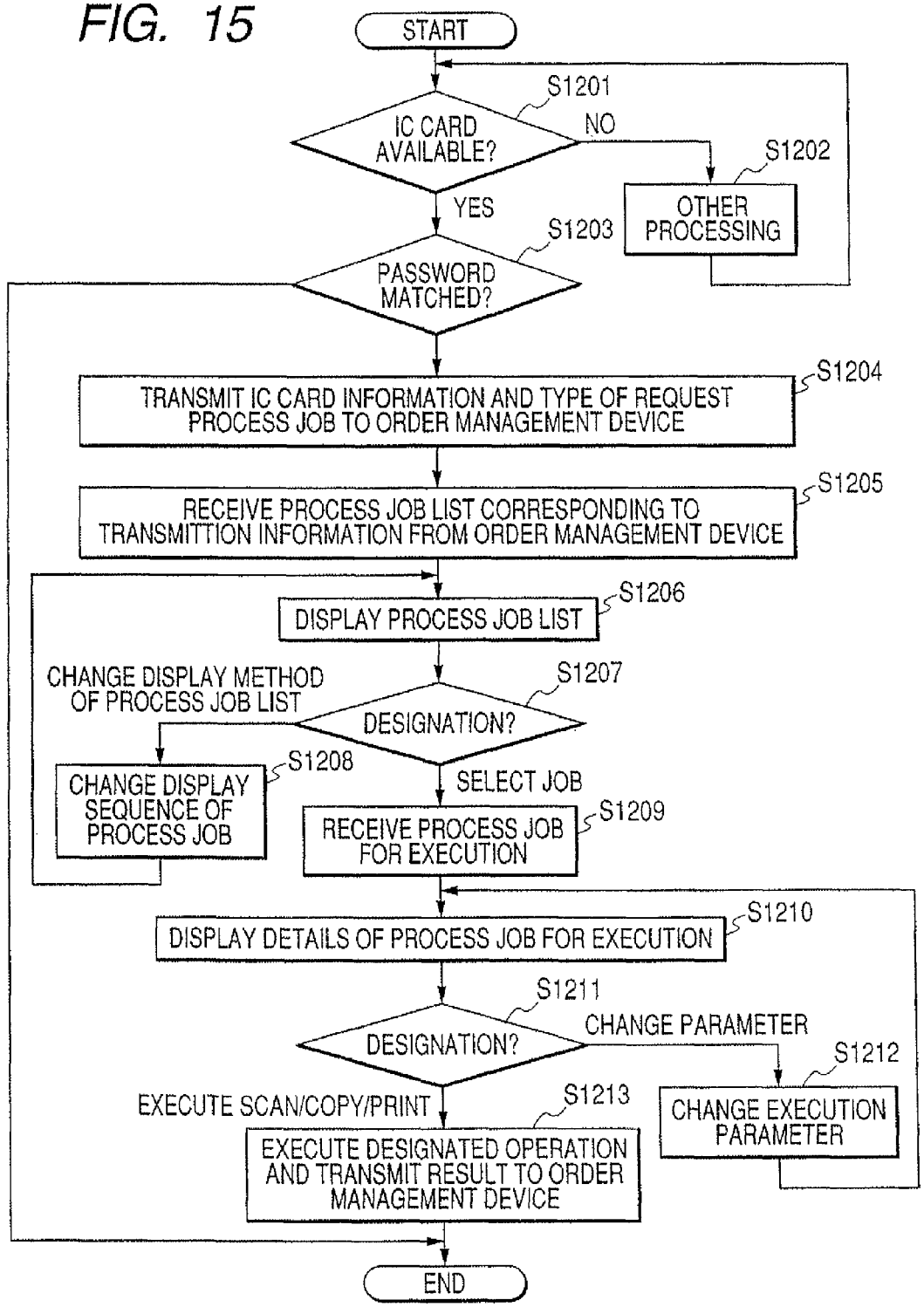
FIG. 15 is a flowchart 2 of the image processing apparatus in the first embodiment.

In this manner, the information on the process job transmitted from the order management apparatus 4 is recognized by the control unit 55 of the apparatus, and the procedure is moved forward to the processing subsequent to the step S105 in FIG. 14 and step S1205 of FIG. 15.

Second Embodiment

A second embodiment of the present invention is different from the first embodiment regarding the configuration of an apparatus operation unit and an extracting method on occasion of extracting the process job of an order management apparatus 4 or the order management apparatus 4, which stores an apparatus schedule function. Hence, a description will be made only on the different point from the first embodiment.

<Configuration of Image Processing Apparatus in Second Embodiment>

Figure 17:
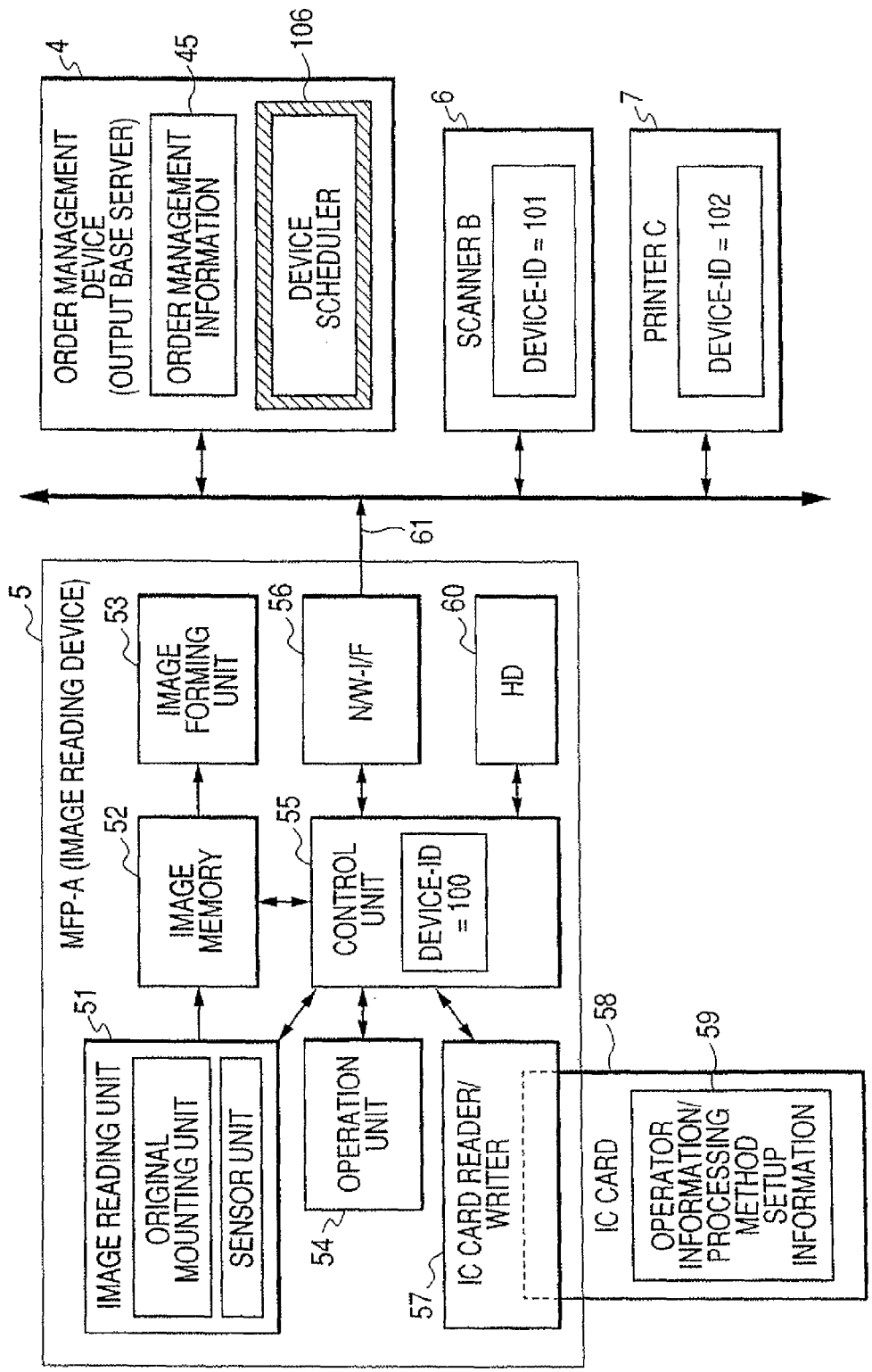
FIG. 17 is a block diagram of an image processing apparatus in a second embodiment.

FIG. 17 is a block diagram of an image processing apparatus in the second embodiment. The different point with the first embodiment is that the order management apparatus 4 has an apparatus scheduler 106. The apparatus scheduler 106 is for scheduling by which apparatus and how soon each process job is executed, each process job being each process of each order stored by the order management apparatus 4.

Figure 18:
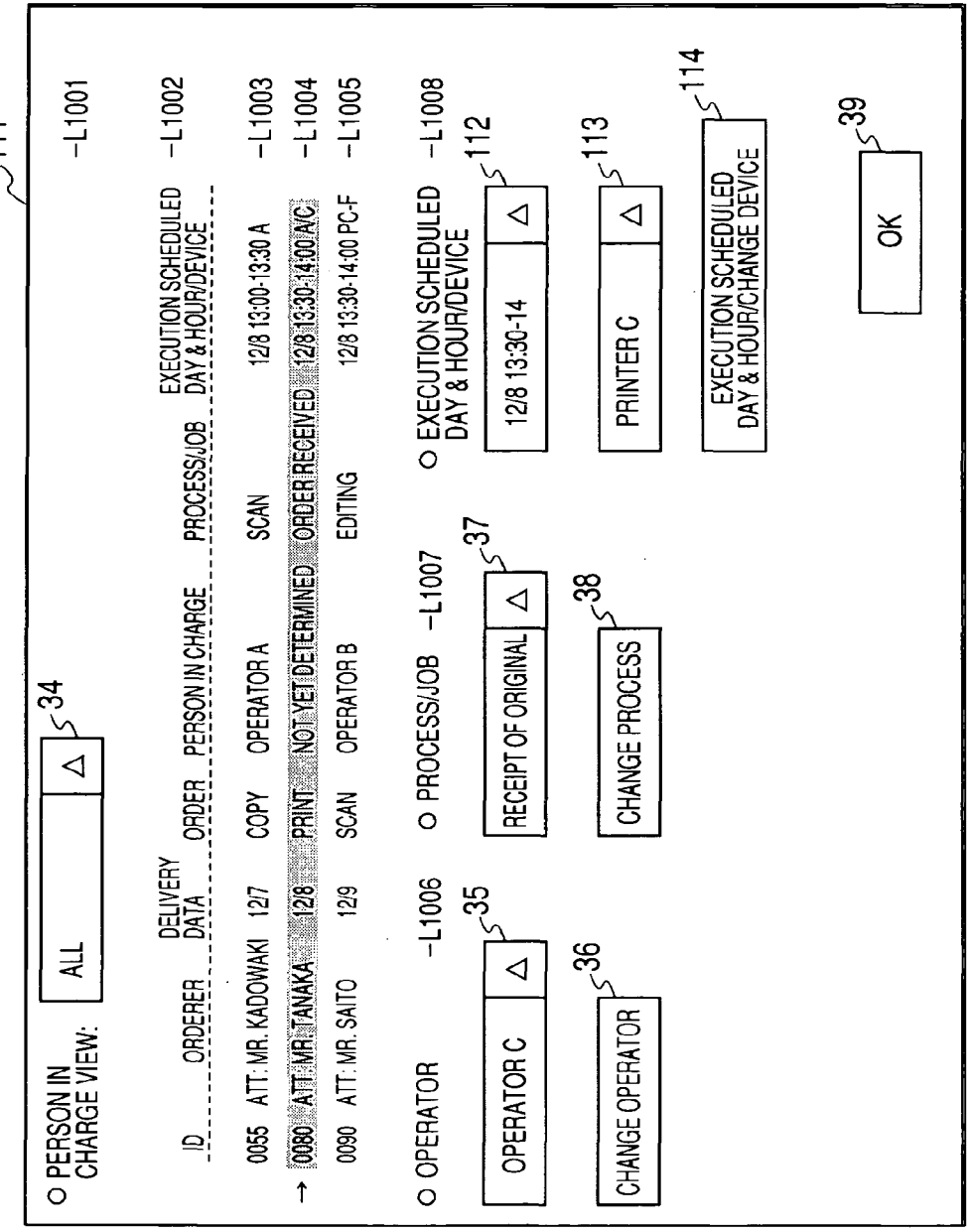
FIG. 18 is a screen of an access soft from the manger PC to the order management apparatus 4 in the second embodiment.

FIG. 18 is a screen of the access soft from a manger PC 10 to the order management apparatus 4 in the second embodiment. The difference with FIG. 6 being the same screen in the first embodiment is that the execution schedule date and hour and the execution schedule apparatus of each process of each order are specified. For example, Row L1003 shows that the process job of the order of an order ID "0055" is scheduled to be executed between 13:00 hours and 13:30 hours of December 8 by an apparatus A. This execution scheduled date and hour and the execution apparatus can be set up by selecting changing alternations by the pull down lists of Numerals 112 and 113 within FIG. 18 in a state in which the process job is selected and by depressing an execution scheduled date and hour/apparatus change key 114. However, a combination of the execution date and hour and the apparatus previously reserved cannot be changed.

In FIG. 18, for simplification of explanation, regarding plural processes of the order, while the scheduled date and hour and the execution scheduled apparatus cannot be specified, it is possible to make reservations in advance for plural processes. Further, in the present embodiment, while an operator PC can be reserved as an apparatus for executing an editing process, in place of the operator PC, the operator itself may be reserved, and in case of reserving the operator, a double booking can be made.

<Operation in Operation Unit of Image Processing Apparatus in Second Embodiment>

Figure 19:
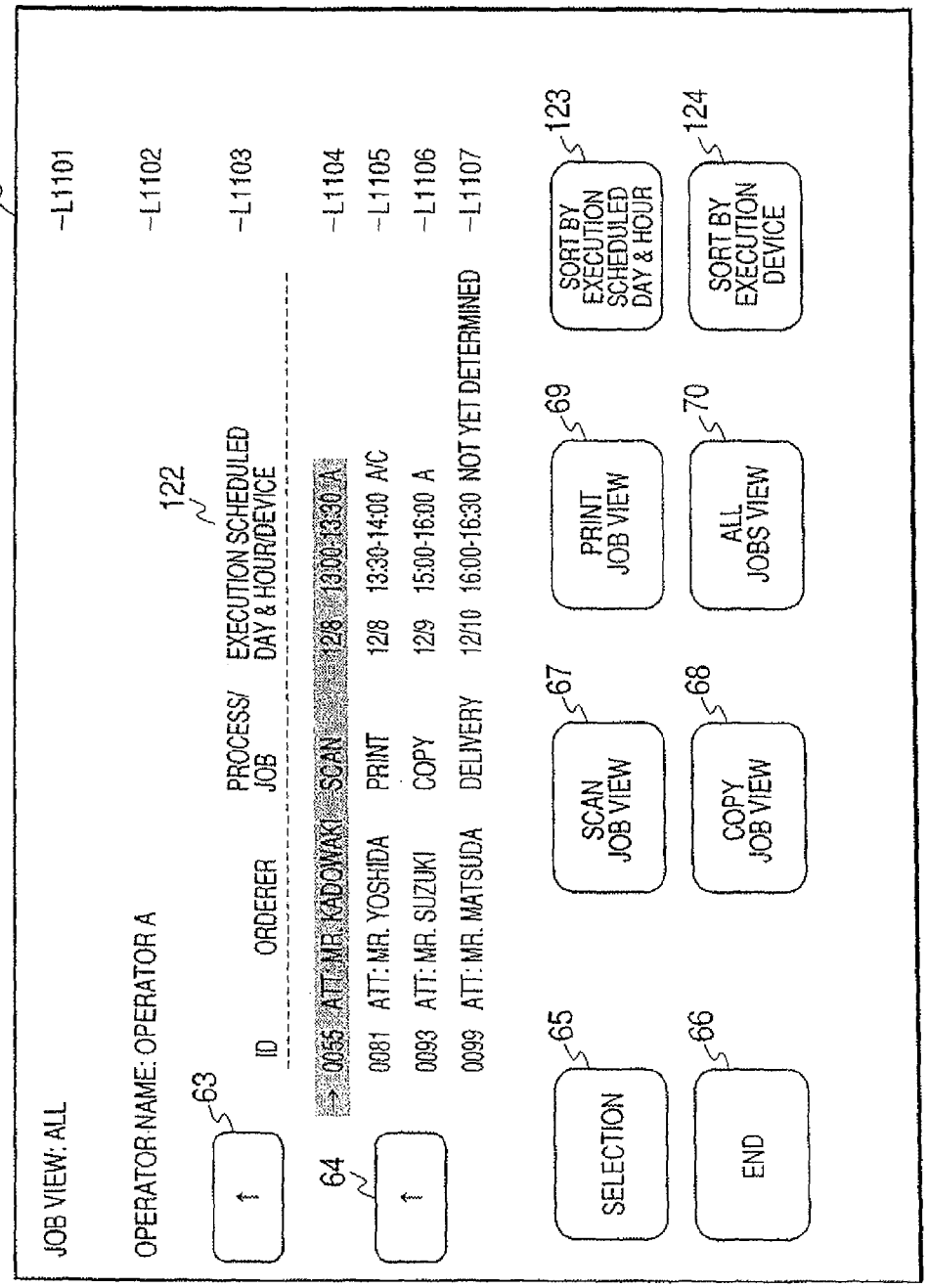
FIG. 19 is a display screen of a list of information on a process job in the operation unit of the image processing apparatus in the second embodiment.

FIG. 19 is a display screen 121 of the information on the process job of the operation unit of an apparatus A in the second embodiment. A fist difference with FIG. 10 being the same screen in the first embodiment is that the execution scheduled date and hour of each process/job and the execution scheduled apparatus 122 are displayed. For example, Row L1104 shows that the scan process and the process job of the order of an order ID "0055" are scheduled to be executed by an apparatus A between 13:00 hours and 13:30 hours of December 8th, and Row L1105 shows that the print process and the process job of the order of an order ID "0081" are scheduled to be executed by either this apparatus A or an apparatus C between 13:40 hours and 14:00 hours of December 8th. In case the execution is scheduled by a plurality of apparatuses, the operator selects any one of the apparatuses, and by instructing the execution by the operation unit of that apparatus, the processing is performed by that apparatus only. In this manner, in FIG. 19, display is limited only for the information on the process job specifying the apparatus A or the information on the process job for which a processing apparatus is not yet determined, and the information on the process job for which another apparatus is specified is not displayed even if the processing content is the same.

A second difference with FIG. 10 is that the information on the process job can be sorted by a sort key 123 sorting by the execution scheduled date and hour, and by a sort key 124 sorting by the execution apparatus. When the control unit 55 of the apparatus A recognizes that the sort key 123 is depressed by the executing scheduled date or the sort key 124 is depressed by the execution apparatus, the display sequence of the operation unit is changed and displayed according to the depressed button.

In this manner, it is possible not only to easily keep track of the process/job close to the execution scheduled date and hour, but also to easily keep track of the process/job reserved by this apparatus only.

<Control Flow of Image Processing Apparatus in Second Embodiment>

Figure 20:
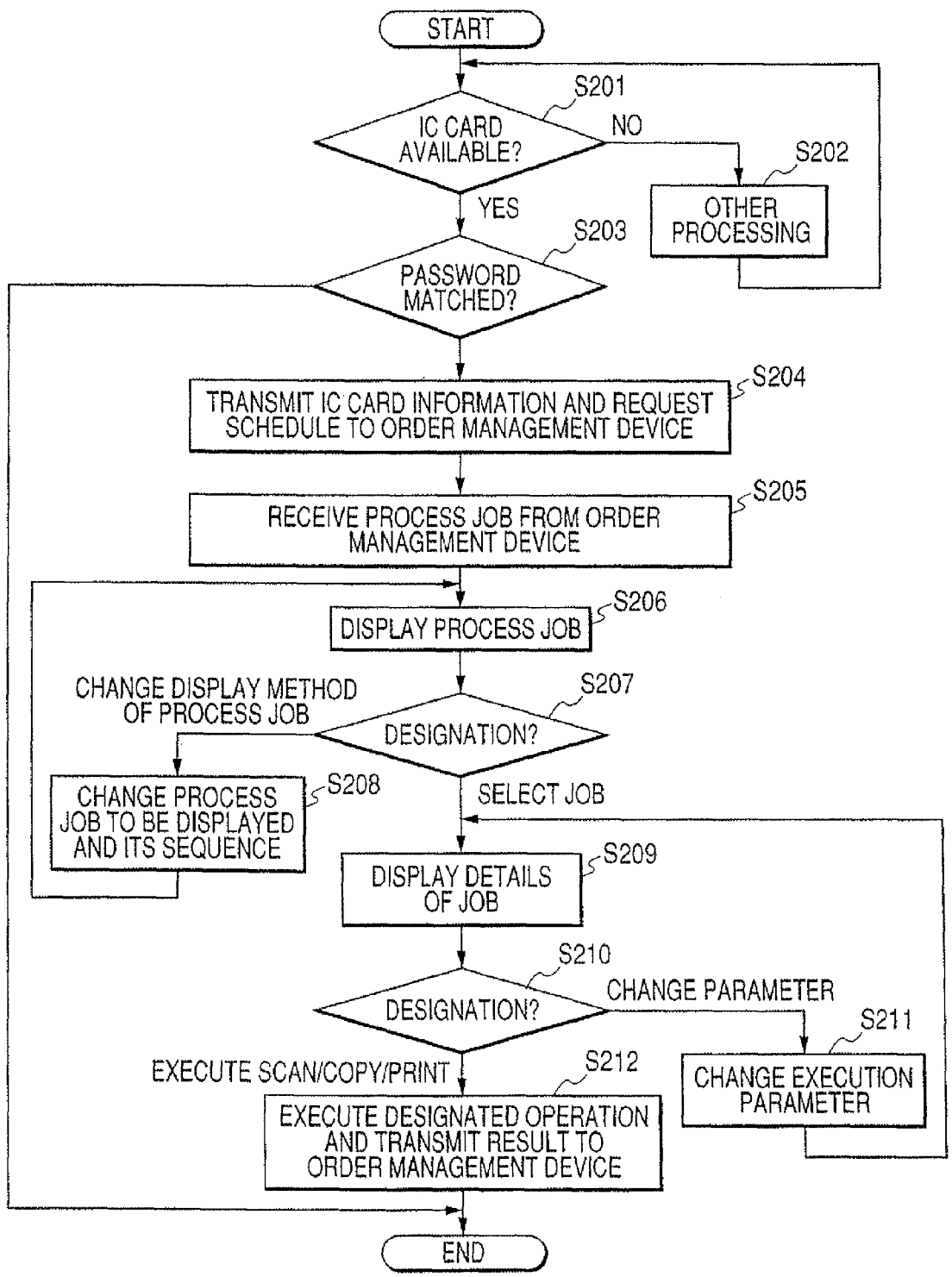
FIG. 20 is a flowchart of the image processing apparatus in the second embodiment.

FIG. 20 is a flowchart of the image processing apparatus in the second embodiment. Since the steps S201 to S203 are the same as steps S101 to S103 of the flowchart in FIG. 14 of the first embodiment, the description thereof will be omitted. As a result of comparison, in case the control unit 55 recognizes that the inputted password and the password 1 within the IC card are matched, the apparatus ID of the image processing apparatus loaded with the IC card by the operator, the information on the IC card and a request schedule range are transmitted to the order management apparatus 4 through the network I/F 56 (S204). The request schedule range specifies a request for information regarding which range the process job is scheduled on the basis of the current date and hour, and for example, it is possible to request for the information only on the process job reserved for the current day.

The control unit 55 acquires the IC card information transmitted at step S204, the apparatus ID, and the information on the process job corresponding to the request schedule range from the order management apparatus 4 through the network I/F 56 S205). Since the processing subsequent after this is the same as subsequent to the step S106 of FIG. 14, the description thereof will be omitted. Further, at the step S205, while the reception of the information on the process job for use of execution is assumed, a configuration may be such that the information on the process job for use of display displayed in the operation unit 54 is acquired, and after that, the information on the process job for use of execution corresponding to the process job selected by the operator may be received.

Further, the difference between the first embodiment and the second embodiment in the order management apparatus will be described. In the second embodiment, since the IC card information, the apparatus ID, and the request schedule range are received from the image processing apparatus, the CPU 70 of the order management apparatus extracts the information on the appropriate process job from the DRAM 72 on the basis of the IC card information, the apparatus ID, and the request schedule range, and transmits it to the image processing apparatus. Other processings are the same as the first embodiment, and therefore, the description thereof will be omitted.

As described above, in the second embodiment, since a processing apparatus is specified in advance for every processing job by the order management apparatus 4, the information on the process job displayed in the operation unit of the apparatus is a process job in charge of the operator carrying the IC card, which is the information on the process job specified to be processed by the apparatus loaded with the IC card and the information on the process job for which the processing apparatus is not yet determined, and moreover, is limited for the information corresponding to the requested schedule range. This limits the information on the process job displayed in the operation unit of the apparatus, and therefore, the operator, can easily select the process job to be processed.

Third Embodiment

A third embodiment of the present invention is different from the first and second embodiments regarding the workflow management function of the order management apparatus 4. Hence, a description will be made only on the different points.

<Configuration of Image Processing Apparatus in Third Embodiment>

Figure 21:
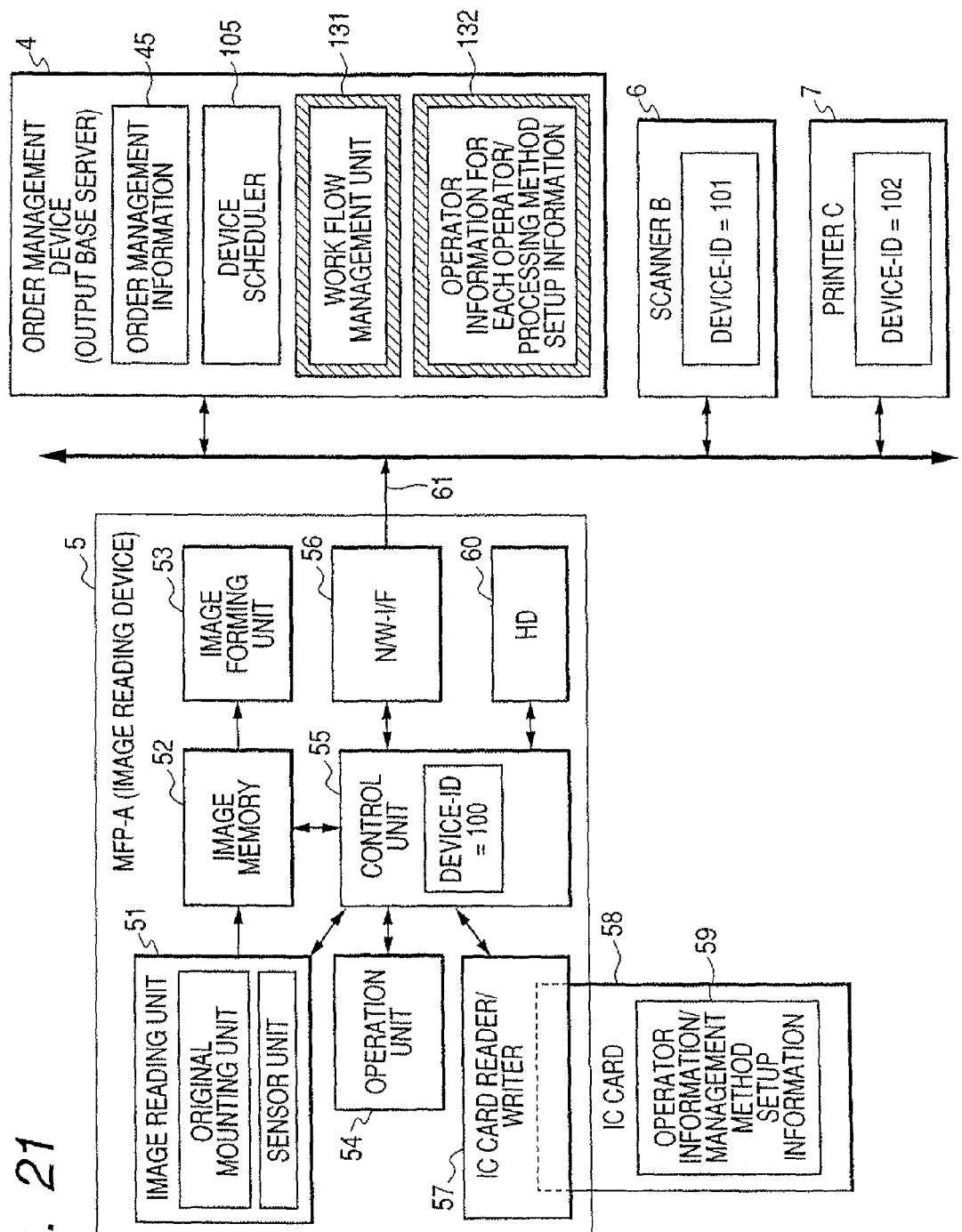
FIG. 21 is a block diagram of an image processing apparatus in a third embodiment.

FIG. 21 is a block diagram of an image reading apparatus in the third embodiment. The different point from the first and second embodiments is that the order management apparatus 4 has a workflow management unit 131. The workflow management unit 131 is for scheduling by which apparatus and how soon each process job, which is each process of each order stored by the order management apparatus 4, is executed, and for speeding up each process, while successively controlling the progressive state. While the apparatus scheduler of the second embodiment has been provided with a simple function of making an execution reservation in advance for each process job of each order, the workflow management unit 131 of the present embodiment defines a processing workflow regarding by which process, by whom and when, and by which apparatus each order is processed, and notifies the operator of that defined processing workflow according to the progressive state of each process, and has also a workflow progress function and the like of giving warning to the manager regarding an order delayed in processing. Further, a HD 60 may store a collection of comments to be transmitted to the next operator or manager at a processing completion time.

<Operation in Operation Unit of Image Processing Apparatus in Third Embodiment>

FIG. 22 is a renewed screen of the workflow in the operation unit 54 of the image processing apparatus. In the scan execution screen of the first embodiment, when the scan execution is performed, the order management apparatus 4 is notified of the scan result, and then, the processing is completed. However, in the present embodiment, when a scan, a print, and a copy are executed, the execution screen as shown in FIG. 11 is shifted to the renewed screen of the workflow of FIG. 22. Row L201 of FIG. 22 displays the information on the process job, which is the target of the current processing.

Numeral 142 of FIG. 22 displays with the information on the entire process/job of the order including the information on that process job. Speaking of the example of FIG. 22, it is shown that this order is processed by the workflow consisting of five processes such as an order entry process, a scan process, an editing/processing process, a print process, and a delivery process, and at present, this order is at the second process being the scan process, and a person in charge is an operator A, and the scan is scheduled to be performed by MFP-A at 15:00 hours to 15:30 hours of December 7. In this manner, by displaying all the process of the order, the future schedule and the entire progressive situation can be easily traced. Further, the operator in charge of the next process can be also traced.

Speaking of the example of FIG. 22, the operator A, after having executed the scan process job by the image processing apparatus loaded with the IC card, selects an operator B as the next operator at Numeral 143 of FIG. 22 in the case of a normal completion, and selects the editing/processing process as the next process at Numeral 144 of FIG. 22, and enters comments in Numeral 145 of FIG. 22 for the next operator/process. When an OK key 146 is depressed, these pieces of information are recognized by the control unit 55, and are transmitted to the workflow management unit 131 within the order management apparatus 4 through a network I/F. The comments referred to here mean messages desired to be transmitted to the manager or the next process operator from the operator having performed the processing. These comments may be voluntarily prepared or these comments may be selected from the collection of comments stored in advance in the HD 60 being the storage unit of the image processing apparatus.

When the information from the image processing apparatus is recognized by the CPU 70 of the order management apparatus, the process of the workflow management unit progresses to the next process, and at the same time, the operator of the next process is notified of the above described comments. In the meantime, in case there exists a problem in a received original, and a scan is not normally performed, at Numeral 143 of FIG. 22, a manger is selected as the next operator, and at Numeral 144, an orderer confirmation is selected as the next process, and in the area of Numeral 145, comments such as "there exists a problem in a received original, and a scan is not normally performed" and the like are entered for the manager, and the OK key 146 is depressed. Then, these pieces of information are transmitted to the workflow management unit 131 within the order management apparatus 4, and the workflow progresses, and at the same time, the comments inputted earlier such as "there exists a problem in a received original, and a scan is not normally performed" and the like are notified to the manager.

In this manner, by progressing up the workflow by using the operation unit 54 of the image processing apparatus or by allowing the processing process of the workflow to be changed, even the operator who is unable to use a PC and is at a low level in IT skill can control the workflow only by using the operation unit of the apparatus.

Further, by inputting the comments into the next process by the apparatus operation unit 54, it is possible, for example, to perform the scan processing by the apparatus and also input detected points promptly by the operation unit of the apparatus so as to be able to notify the next process operator of the points, thereby reducing the transmission leakage of the information.

<Control Flow of Image Processing Apparatus in Third Embodiment>

Figure 23:
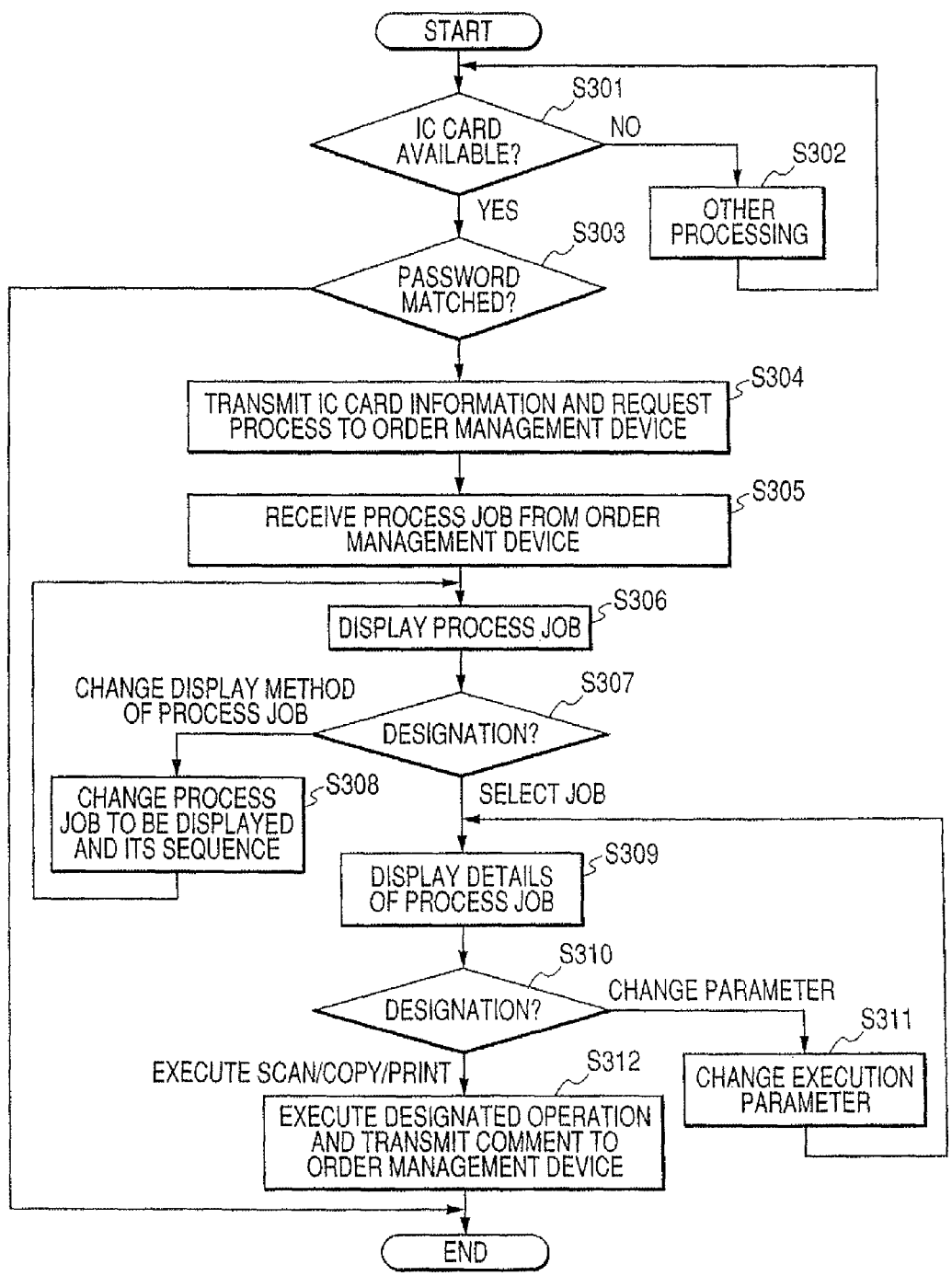
FIG. 23 is a flowchart of the image processing apparatus in the third embodiment.

FIG. 23 is a flowchart of the image processing apparatus in the third embodiment. Since steps S301 to S303 are the same as steps S101 to S103 of FIG. 14, the description thereof will be omitted. As a result of comparison, in case the control unit 55 determines that the inputted password and the password 1 within the IC card are matched, the apparatus ID of the image processing apparatus loaded with the IC card by the operator, the information on the IC card, and the request process are transmitted to the order management apparatus 4 (S304). The request process means a request for the information on the process job in the specified process, and for example, when the scan process is specified, it is equivalent to a request for the information on the process job in the current scan process. Similarly, specifying the print process and the copy process is equivalent to a request for the information only on the process job currently in the print process or the copy process.

Next, the control unit 55 acquires the IC card information transmitted at step S304, the information on the process job corresponding to the apparatus ID, and the information on the process job corresponding to the request process, and the process information of at least the subsequent stage of the appropriate process job from the order management apparatus 4 through the network I/F (S305). The information on the process job acquired at step S305 is taken as the information on the process job for use of execution. Further, the process information referred to here means the information on the processing process other than the present process job of the order including the present process job displayed in Rows L1203 and L1205 to L1207 of FIG. 22, and means an operator in charge of other processing processes, processing scheduled date and hour, a processing scheduled apparatus and the like. Further, in the present patent application, the process information of at least subsequent stage may be displayed, and therefore, for example, even in case the subsequent stage of the present process job is displayed, the information at the preceding stage or the subsequent stage of the present process job may be displayed.

The processing of S306 to S311 is the same as that of S106 to S111 of FIG. 13 and the description thereof will be omitted.

In the present embodiment, after executing a scan, copy or print the operator inputs in the screen of FIG. 22 the next process, a person in charge of the next process, a comment for the next process and the like and transmits the input information together with the process result of the present process to the order management apparatus 4 (S312).

In the present embodiment information on the process job for user of execution is acquired in step S305. However, a configuration may be such that only information on the process job for use of display to be displayed in the operation unit 54 is acquired and after that information on the process job for user of execution corresponding to the selected process job is received.

Further, the different points from the first and second embodiments in the order management apparatus will be described. In the third embodiment, since the IC card information and the apparatus ID, the request process are received from the image processing apparatus, the CPU 70 of the order management apparatus extracts the appropriate information on the process job from the DRAM 72 based on the IC card information, the apparatus ID and the request process, and transmits it to the image processing apparatus. Other processings are the same as the first and second embodiments, and therefore, the description thereof will be omitted.

As described above, in the third embodiment, the information on the process job displayed in the operation unit of the apparatus is a process job in charge of the operator carrying the IC card, and together with the information on the process job specified to be processed by the apparatus loaded with the IC card, the information on other processes relating to the information on that process job are also displayed. In this manner, the information on the process job displayed in the operation unit of the apparatus is limited, and thus it becomes not only easy to select the information, but also easy to transmit the comments to the operator of other processes or the manager.

Further, another configuration of the third embodiment will be shown as follows. This configuration is a combination of the second and third embodiments, and only a part of the flowchart shown in FIG. 23 is different. Hence, the different point alone will be described.

At steps S304, as the information to be transmitted to the order management apparatus, together with the apparatus ID of the image processing apparatus loaded by the operator, the IC card information, and the request process, the request schedule range is transmitted to the order management apparatus 4. This is the different point as described above. In this manner, displayed in the operation unit of the apparatus is the information on the process job in charge of the operator carrying the IC card, and it is the information on the process job specified to be processed by the apparatus loaded with the IC card, and at the same time, it is the information on the process job corresponding to the request process and the request schedule range. In this manner, it is possible to further limit the information on the process job displayed in the operation unit of the apparatus.

The different points regarding the processing content of an operator management apparatus at this time will be described. In case the second and third embodiments are combined, the combined embodiments receive the IC card information transmitted from the image processing apparatus, the apparatus ID, the request schedule range, and the request process, and therefore, the CPU 70 of the order management apparatus extracts the information on the appropriate process job from the DRAM 72 based on the IC card information, the apparatus ID, the request schedule range, and the request process to transmit it to the image processing apparatus. Other processings are the same as the first and second embodiments, and therefore, the description thereof will be omitted.

In each of the above described embodiments, while the contact type IC card 58 and the contact type IC card reader writer 57 have been used, a non-contact type radio type IC card and a radio type IC card reader writer may be used. Further, not only a radio wave type IC card, but also those of a non contact type and capable of exchanging operator identification information and service list information may be used. For example, a mobile phone, PHS, PDA or an infrared communication system can be cited. Further, a configuration in which the operator directly inputs the password into the operation unit of the apparatus and a configuration in which the operator identification information is acquired by bio-certification means such as a finger print recognition may be used.

Further, in the above described embodiments, while the display of the information on the process job and the selection of the process job and the like have been performed by the operation unit 54 of the apparatus, the operation unit 105 of a front end PC 106 used with the apparatus 5 exclusively on one for one base may be used.

In each of the above described embodiments, in case a request for the information on the process job is received from the apparatus, the CPU 70 of the order management apparatus 4 performs the processing of extracting the process job corresponding to the apparatus ID. However, instead of performing the extracting processing based on the apparatus ID by the CPU 70 of the order management apparatus 4, the control unit of the apparatus side may perform the extracting processing based on the apparatus ID.

Further, in each of the above described embodiments, while the order management apparatus 4 and various types of the apparatuses have been connected by the Intranet, the same applies to the case where the order management apparatus 4 exists on the Internet.

The present invention has an advantage of being able to provide a system in which the image processing apparatus and the workflow server are connected, and by using the operation unit only of the image processing apparatus without using a PC, the workflow of the operator in the centralized copy room and the print center of the company can be smoothly moved forward.

This application claims priorities from Japanese Patent Application Nos. 2004-208632 filed on Jul. 15, 2004, and 2005-145530 filed on May 18, 2005, which are hereby incorporated by reference herein.

What is claimed is:

1. An image processing apparatus which detects a medium on which an original image is recorded, the image processing apparatus comprising:
    a display control unit configured to control displaying of a selection screen on which a plurality of processing instruction selections are arranged in a display sequence;
    a receiving unit configured to receive a selection instruction for one processing instruction selection of the plurality of processing instruction selections displayed on the selection screen by the display control unit; and
    a performing unit configured to perform processing corresponding to the one processing instruction selection based on the selection instruction received by the receiving unit,
    wherein the display control unit controls the displaying such that when the medium is detected, a processing instruction selection relating to the medium is placed at a start position of the display sequence on the selection screen, the processing instruction selection placed at the start position after the detecting of the medium being different from the processing instruction selection placed at the start position before the detecting of the medium.

2. An apparatus according to claim 1, further comprising a detecting unit configured to detect the medium,
    wherein, when the detecting unit detects the medium, the display control unit controls the displaying such that a copy instruction selection or a scan instruction selection is placed at the start position as the processing instruction selection relating to the medium and a print instruction selection is placed subsequent to the start position as a processing instruction selection not relating to the medium.

3. An apparatus according to claim 1, wherein each of the plurality of processing instruction selections can be selected by a user, and wherein the display control unit controls the displaying such that the plurality of processing instruction selections are vertically arranged in a list in the display sequence.

4. An image processing method which detects a medium on which an original image is recorded, the method comprising:
    controlling displaying of a selection screen on which a plurality of processing instruction selections are arranged in a display sequence;
    receiving a selection instruction for one processing instruction selection of the plurality of processing instruction selections displayed on the selection screen in the controlling; and
    performing processing corresponding to the one processing instruction selection based on the selection instruction received in the receiving,
    wherein the controlling controls the displaying such that when the medium is detected, a processing instruction selection relating to the medium is placed at a start position of the display sequence on the selection screen, the processing instruction selection placed at the start position after the detecting of the medium being different from the processing instruction selection placed at the start position before the detecting of the medium.

5. A method according to claim 4, further comprising detecting the medium,
    wherein, when the detecting detects the medium, the controlling controls the displaying such that a copy instruction selection or a scan instruction selection is placed at the start position as the processing instruction selection relating to the medium and a print instruction selection is placed subsequent to the start position as a processing instruction selection not relating to the medium.

6. A method according to claim 4, wherein each of the plurality of processing instruction selections can be selected by a user, and wherein the controlling controls the displaying such that the plurality of processing instruction selections are vertically arranged in a list in the display sequence.

7. A non-transitory storage medium storing a computer-executable program for causing a computer to execute an image processing method which detects a medium on which an original image is recorded, the method comprising:

controlling displaying of a selection screen on which a plurality of processing instruction selections are arranged in a display sequence;

receiving a selection instruction for one processing instruction selection of the plurality of processing instruction selections displayed on the selection screen in the controlling; and performing processing corresponding to the one processing instruction selection based on the selection instruction received in the receiving, wherein the controlling controls the displaying such that when the medium is detected, a processing instruction selection relating to the medium is placed at a start position of the display sequence on the selection screen, the processing instruction selection placed at the start position after the detecting of the medium being different from the processing instruction selection placed at the start position before the detecting of the medium.

8. A storage medium according to claim 7, further comprising detecting the medium, wherein, when the detecting detects the medium, the controlling controls the displaying such that a copy instruction selection or a scan instruction selection is placed at the start position as the processing instruction selection relating to the medium and a print instruction selection is placed subsequent to the start position as a processing instruction selection not relating to the medium.

9. A storage medium according to claim 7, wherein each of the plurality of processing instruction selections can be selected by a user, and wherein the controlling controls the displaying such that the plurality of processing instruction selections are vertically arranged in a list in the display sequence.

* * * * *